United States Patent
Ishihara

(10) Patent No.: US 6,487,374 B1
(45) Date of Patent: Nov. 26, 2002

(54) VIEWFINDER OPTICAL SYSTEM

(75) Inventor: Jun Ishihara, Kobe (JP)

(73) Assignee: Minolta Co., Ltd., Osaka (JP)

( * ) Notice: Subject to any disclaimer, the term of this patent is extended or adjusted under 35 U.S.C. 154(b) by 160 days.

(21) Appl. No.: 09/591,350

(22) Filed: Jun. 9, 2000

Related U.S. Application Data

(62) Division of application No. 09/228,685, filed on Jan. 12, 1999, now Pat. No. 6,122,454.

(30) Foreign Application Priority Data

| Jan. 13, 1998 | (JP) | ............................................. 10-004681 |
| Jan. 16, 1998 | (JP) | ............................................. 10-006377 |
| Jan. 16, 1998 | (JP) | ............................................. 10-006380 |
| Jan. 16, 1998 | (JP) | ............................................. 10-006387 |
| Jan. 16, 1998 | (JP) | ............................................. 10-006398 |

(51) Int. Cl.[7] ............................................. G03B 13/08
(52) U.S. Cl. ..................... 396/385; 359/364; 359/643; 359/726
(58) Field of Search ................. 359/364, 365, 359/366, 643, 726, 727, 728, 729, 730, 731; 396/373, 382, 384, 385, 386

(56) References Cited

U.S. PATENT DOCUMENTS

| 3,810,221 | A | 5/1974 | Plummer | .................... 88/1.5 R |
| 3,836,931 | A | 9/1974 | Plummer | ..................... 354/155 |
| 3,860,940 | A | 1/1975 | Baker | .......................... 354/155 |
| 3,958,261 | A | 5/1976 | Land et al. | ................... 354/295 |
| 5,095,326 | A | 3/1992 | Nozaki et al. | ................ 354/222 |
| 5,663,833 | A | 9/1997 | Nanba et al. | ................ 359/631 |
| 5,701,202 | A | 12/1997 | Takahashi | .................... 359/631 |
| 5,749,008 | A | 5/1998 | Ishihara et al. | ............. 396/373 |
| 5,886,824 | A | 3/1999 | Takahashi | .................... 359/633 |
| 5,982,561 | A | 11/1999 | Ishihara | ....................... 359/708 |
| 6,166,866 | A | * 12/2000 | Kimura et al. | ............... 359/720 |

FOREIGN PATENT DOCUMENTS

| JP | 7-191274 A | 7/1995 |
| JP | 7-218860 A | 8/1995 |
| JP | 7-234376 A | 9/1995 |
| JP | 8-292371 A | 11/1996 |
| JP | 9-083908 A | 3/1997 |
| JP | 9-222564 A | 8/1997 |

* cited by examiner

*Primary Examiner*—David M. Gray
(74) *Attorney, Agent, or Firm*—Sidley Austin Brown & Wood LLP

(57) ABSTRACT

A viewfinder optical system directs a luminous flux emanating from an image plane to a pupil. The viewfinder optical system has an eyepiece optical system. The eyepiece optical system enlarges an image in order to be viewed by the pupil. The eyepiece optical system has a first lens unit, a second lens unit and a third lens unit. The first lens unit has at least one surface having a positive optical power. The second lens unit has at least one surface having a negative optical power. The third lens unit has a reflecting surface having a positive Optical power.

25 Claims, 30 Drawing Sheets

FIG.8
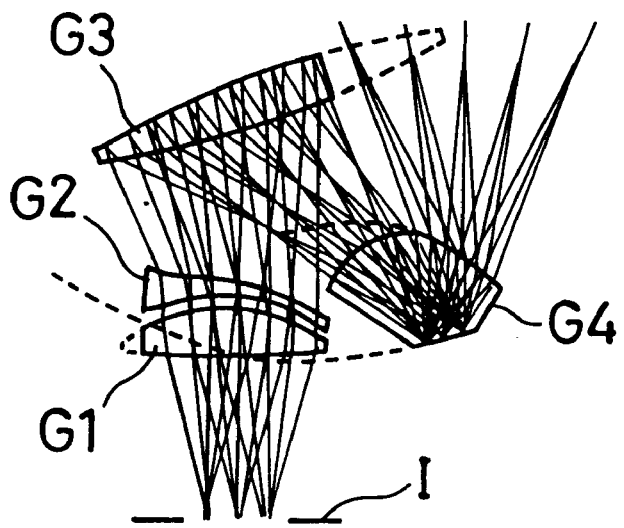
FIG.9
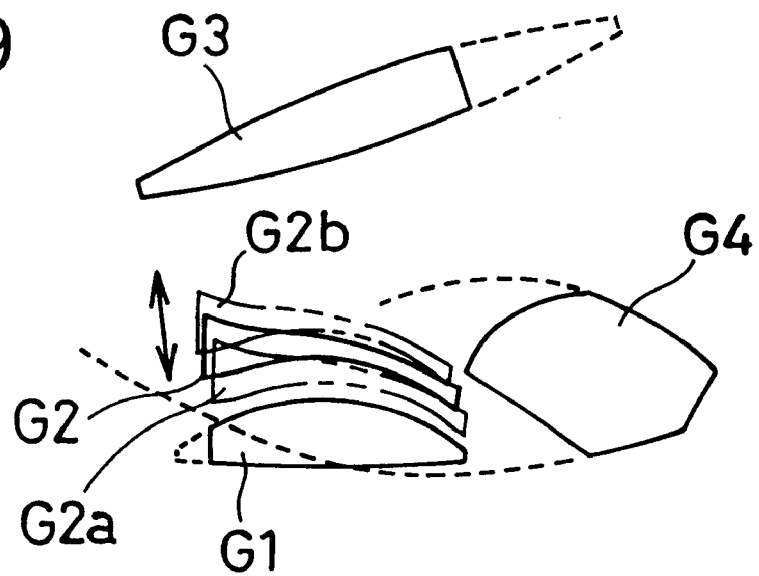

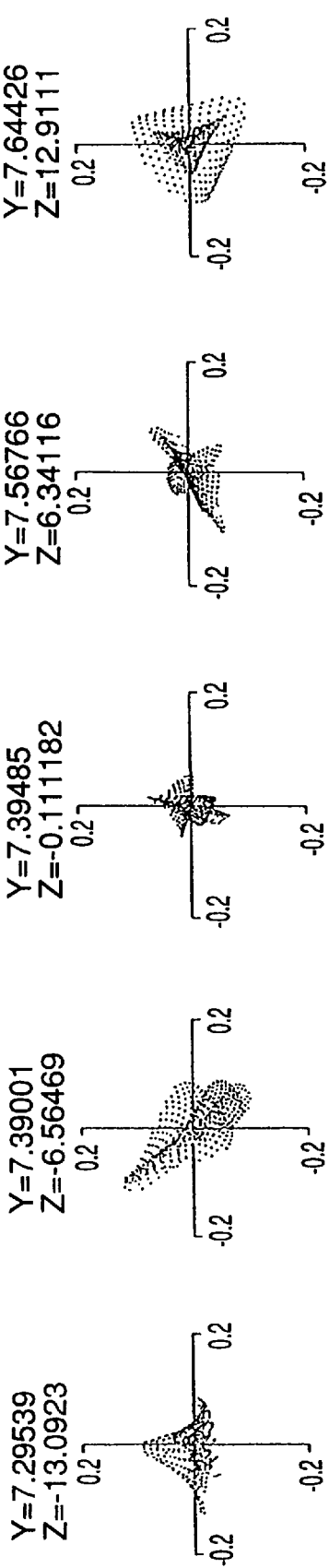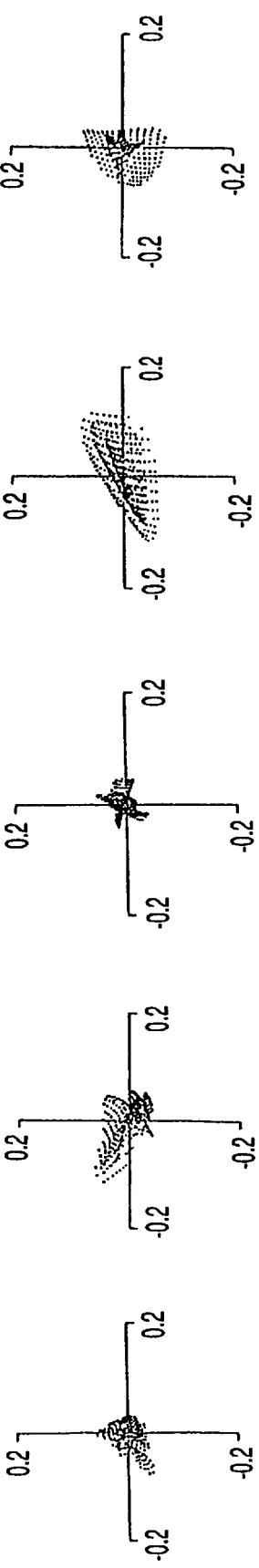

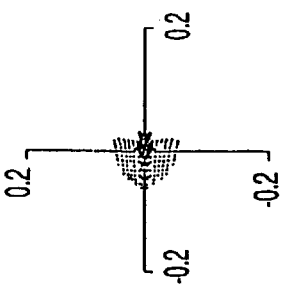
FIG. 11k  Y=1.05462e-18  Z=-13.0157
FIG. 11l  Y=-2.87623e-19  Z=-6.35628
FIG. 11m  Y=1.91748e-19  Z=0.00115643
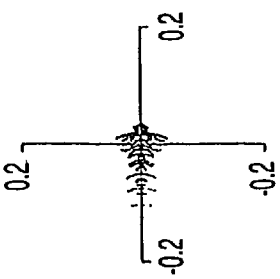
FIG. 11n  Y=-2.49273e-18  Z=6.40495
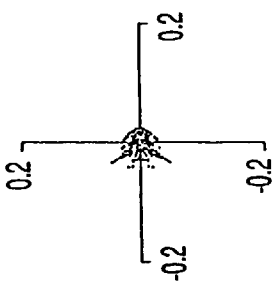
FIG. 11o  Y=9.10805e-19  Z=13.1097

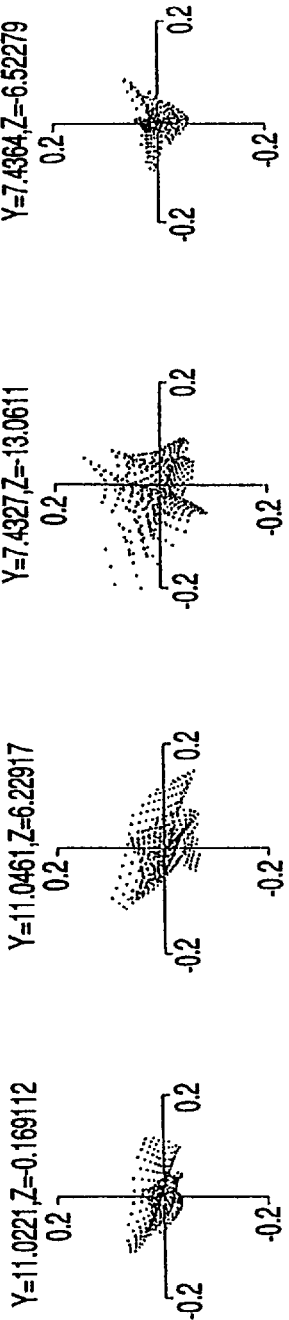
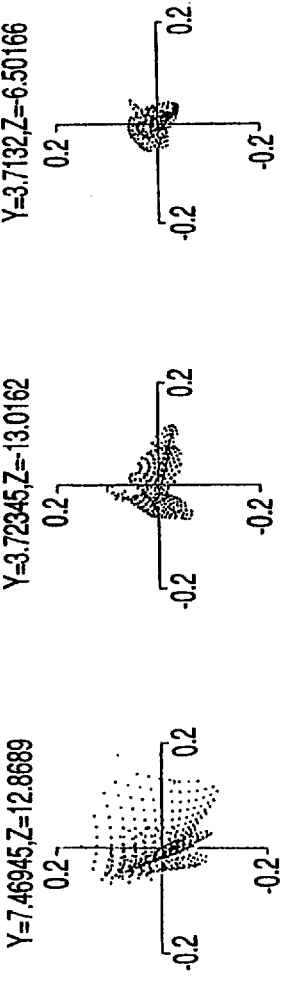
FIG. 12a Y=11.0325,Z=6.57492
FIG. 12b Y=11.0221,Z=0.169112
FIG. 12c Y=11.0461,Z=6.22917
FIG. 12d Y=7.4327,Z=-13.0611
FIG. 12e Y=7.4364,Z=6.52279
FIG. 12f Y=7.39165,Z=-0.0757326
FIG. 12g Y=7.36599,Z=6.30278
FIG. 12h Y=7.46945,Z=-12.8889
FIG. 12i Y=3.72945,Z=-13.0162
FIG. 12j Y=3.7132,Z=6.50166

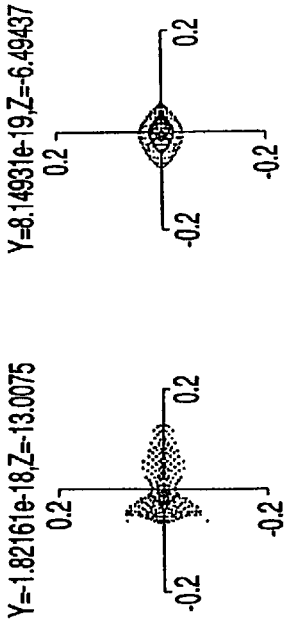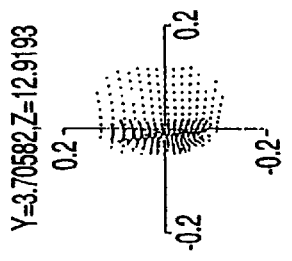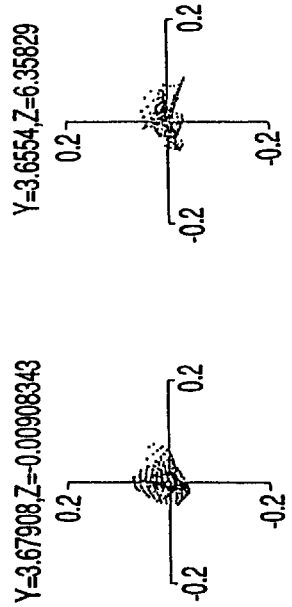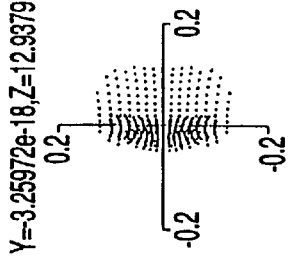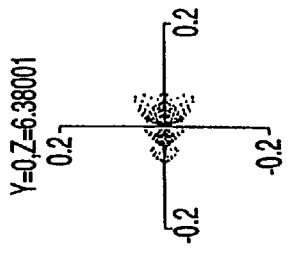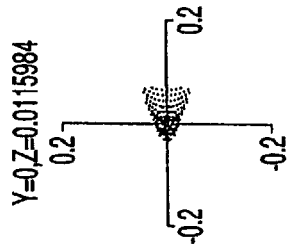

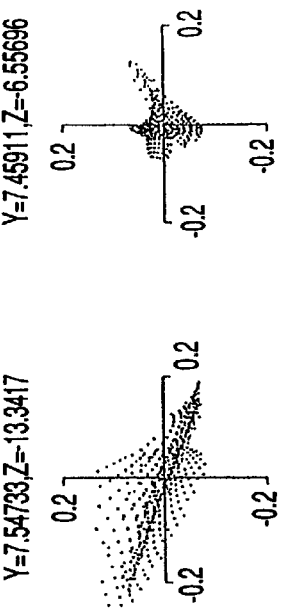
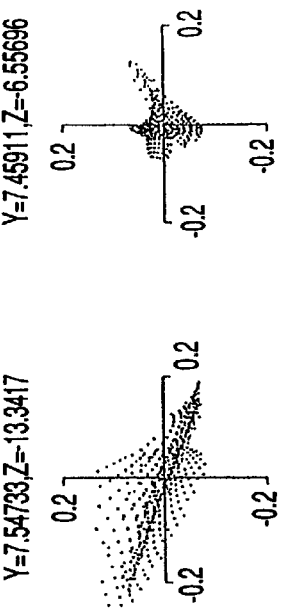
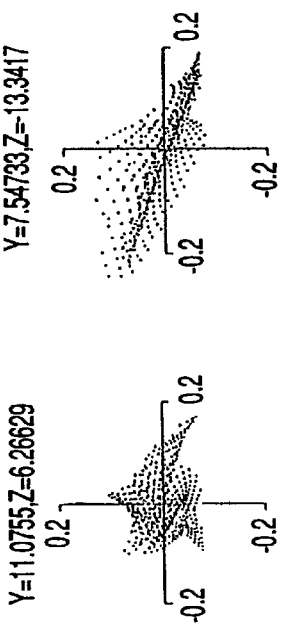
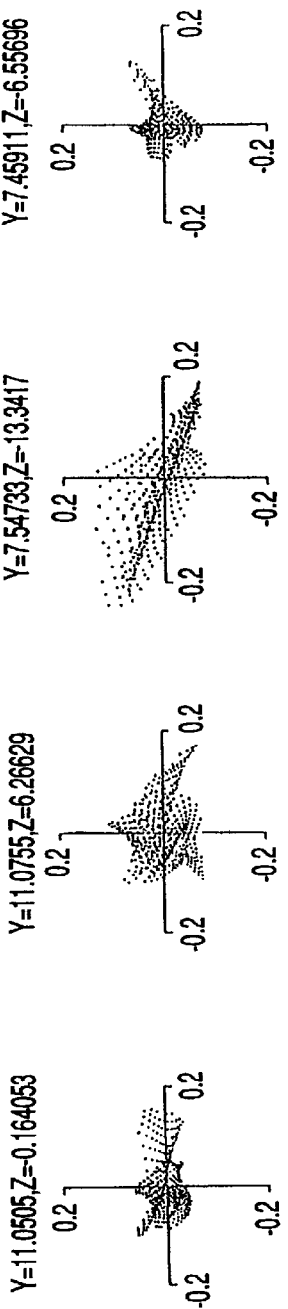
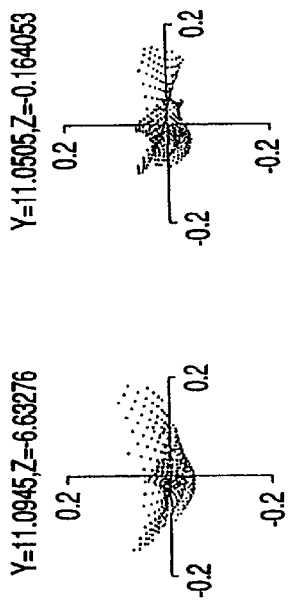
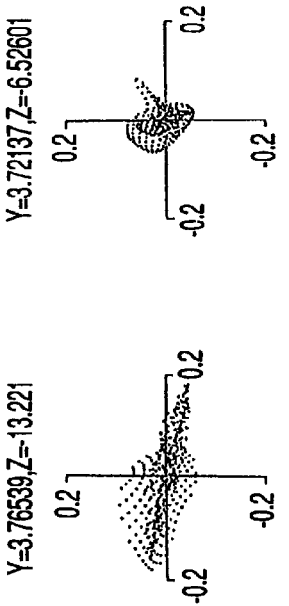
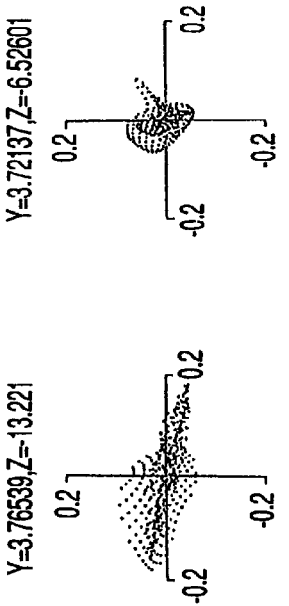
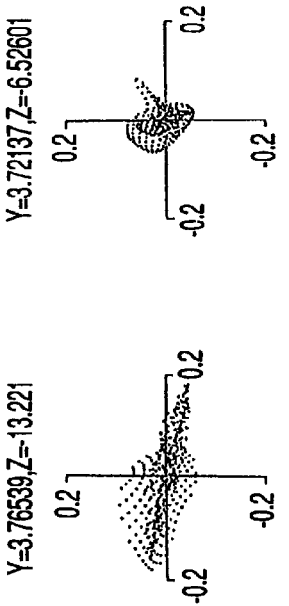
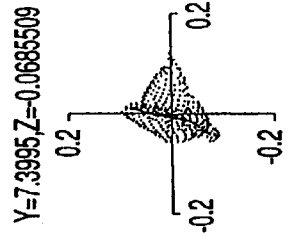

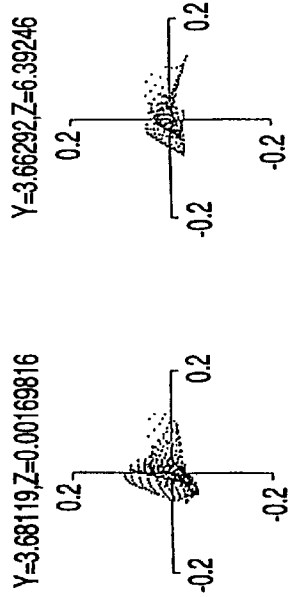
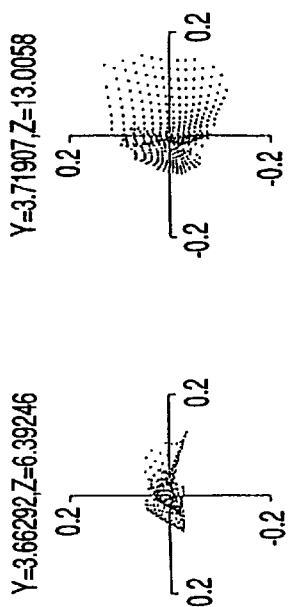
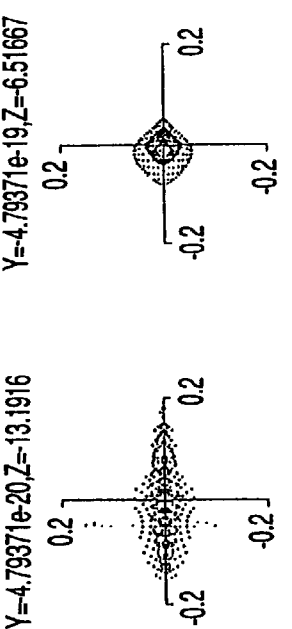
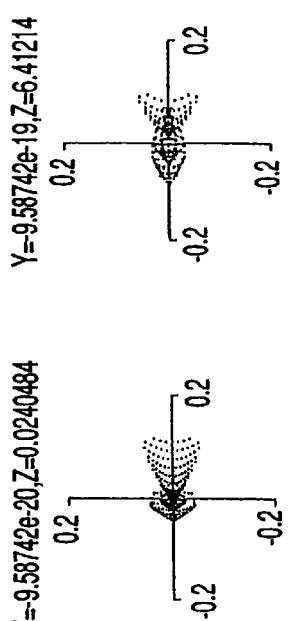
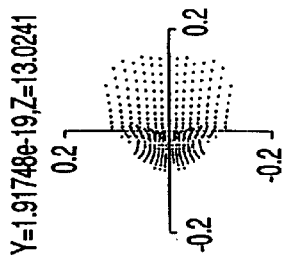

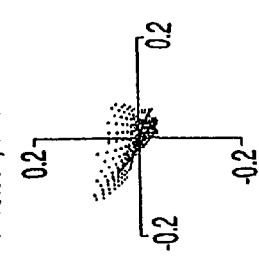
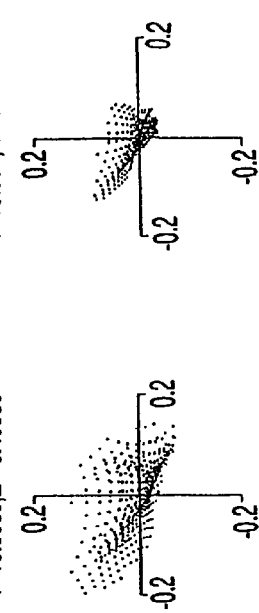
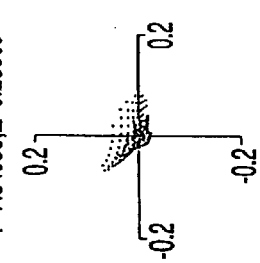
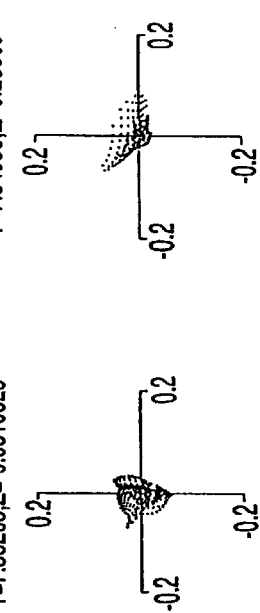

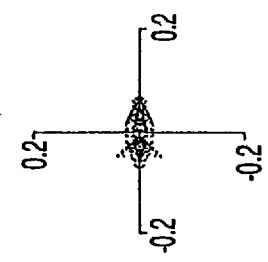
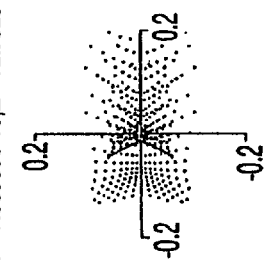
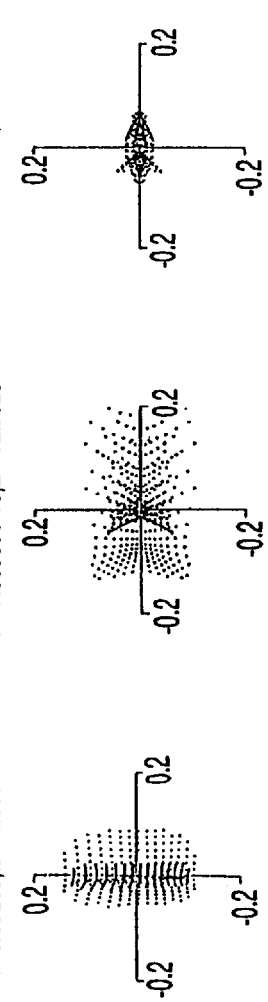
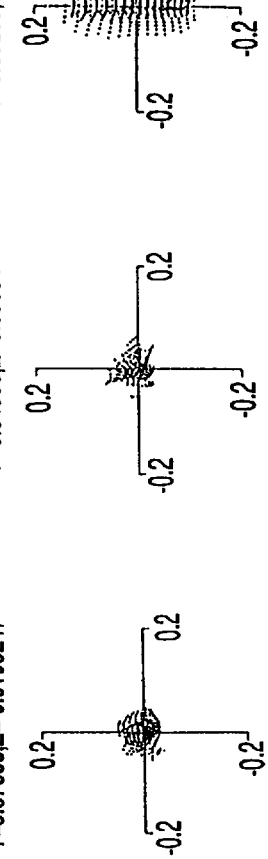
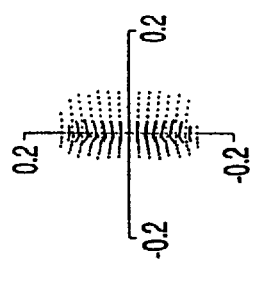
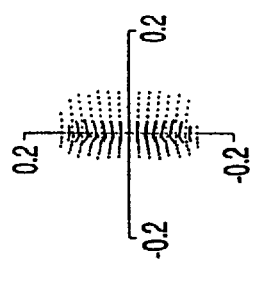
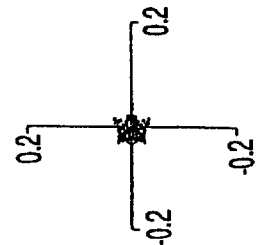

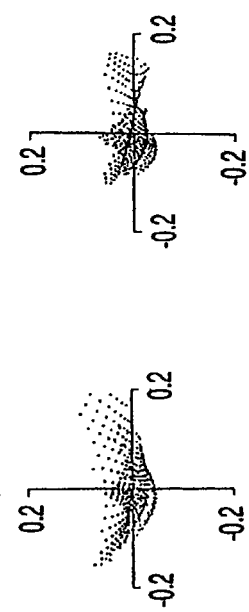
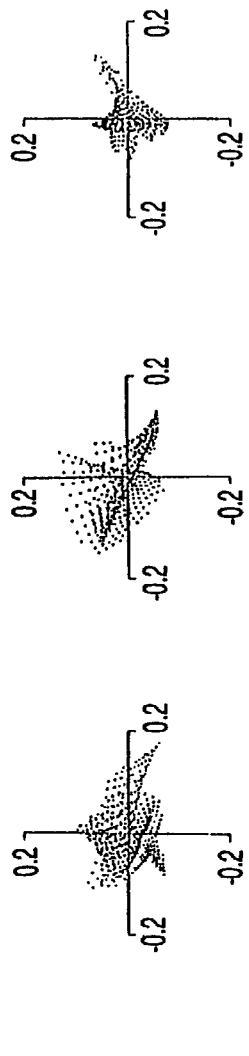
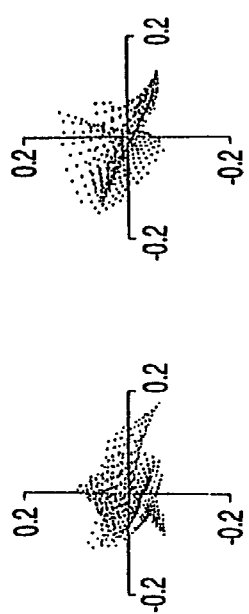
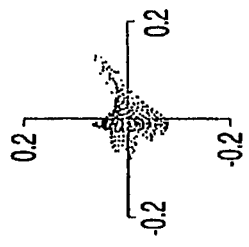
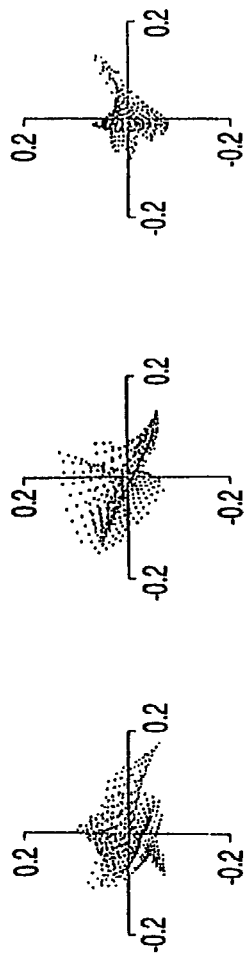
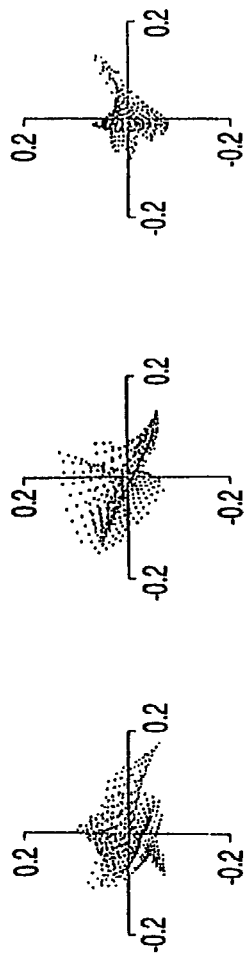
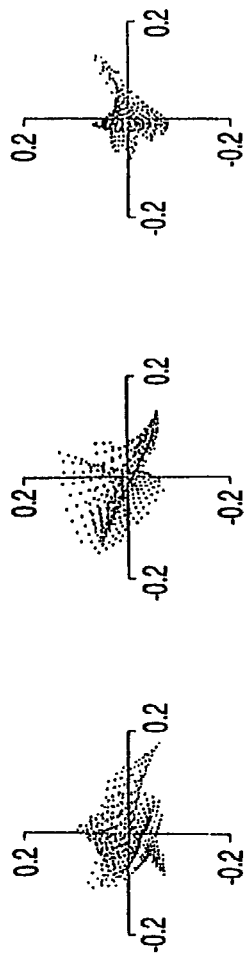
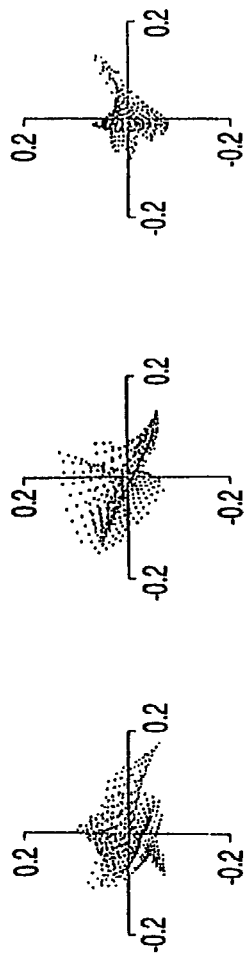
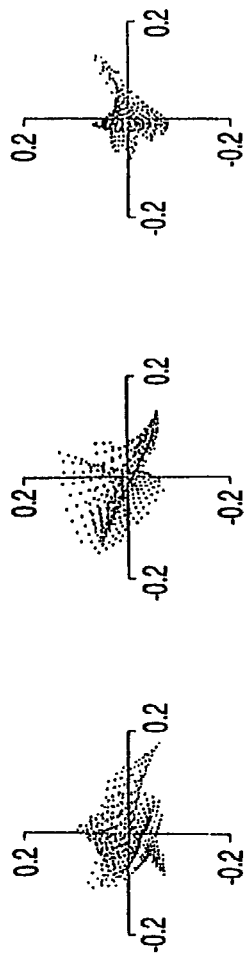
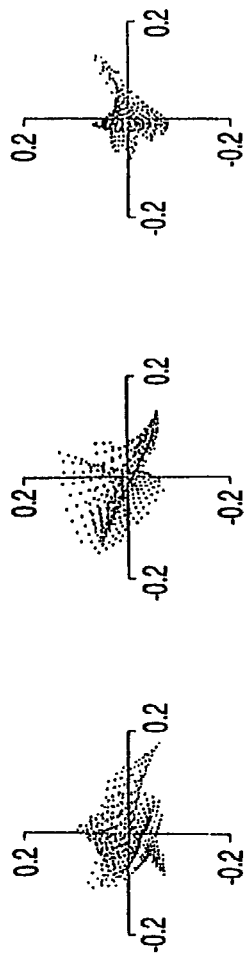
FIG. 15a Y=11.0896,Z=-6.62179
FIG. 15b Y=11.0487,Z=-0.167838
FIG. 15c Y=11.0679,Z=6.2566
FIG. 15d Y=7.52387,Z=13.2444
FIG. 15e Y=7.45943,Z=6.55372
FIG. 15f Y=7.39895,Z=-0.0716831
FIG. 15g Y=7.37611,Z=-6.33276
FIG. 15h Y=7.49039,Z=-12.9478
FIG. 15i Y=3.7572,Z=13.1508
FIG. 15j Y=3.72251,Z=6.52624

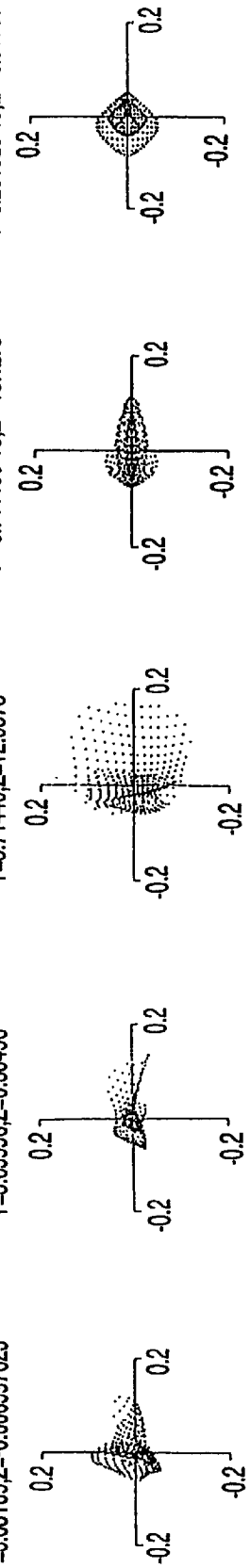
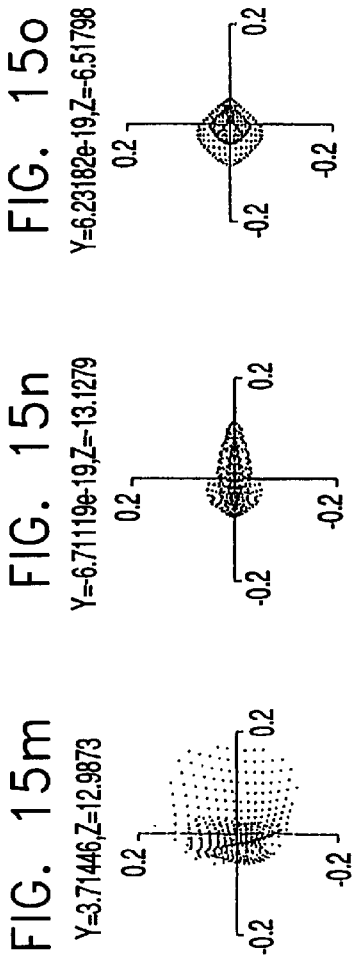
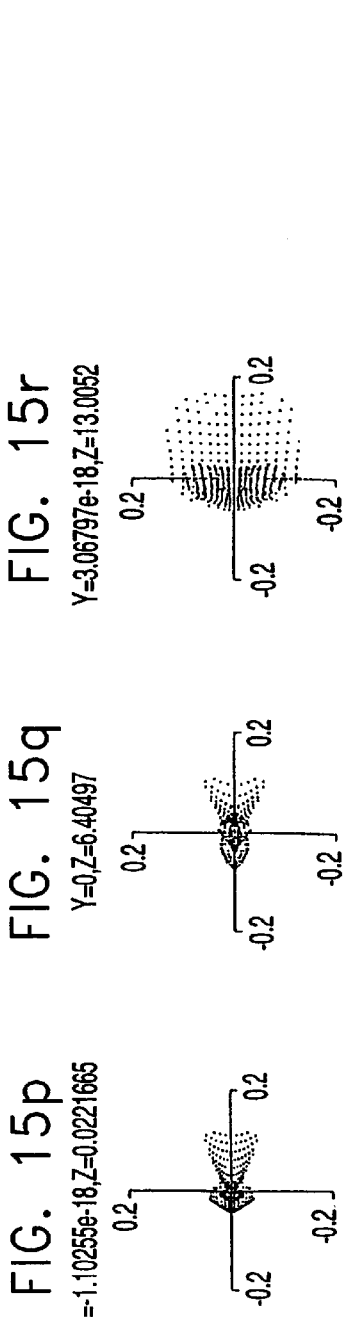
FIG. 15k  Y=3.68109,Z=0.000597623
FIG. 15l  Y=3.65996,Z=6.38496
FIG. 15m  Y=3.71446,Z=12.9873
FIG. 15n  Y=-6.71119e-19,Z=13.1279
FIG. 15o  Y=6.23182e-19,Z=-6.51798
FIG. 15p  Y=-1.10255e-18,Z=0.0221665
FIG. 15q  Y=0,Z=6.40497
FIG. 15r  Y=-3.06797e-18,Z=13.0052

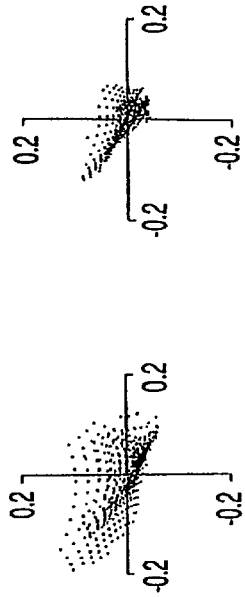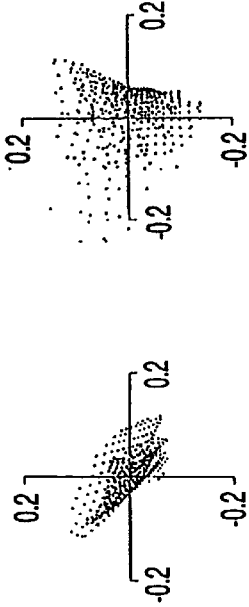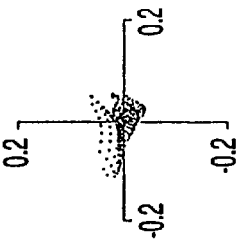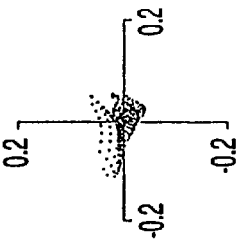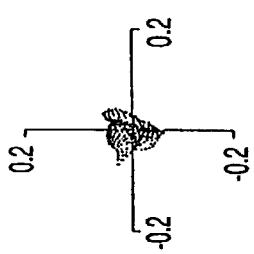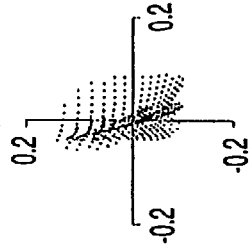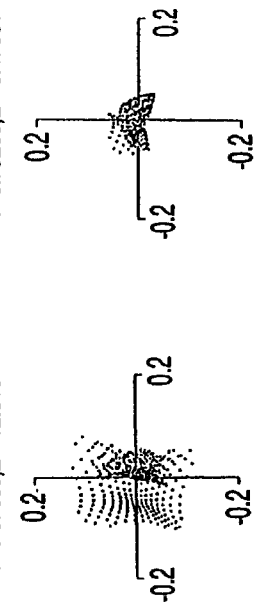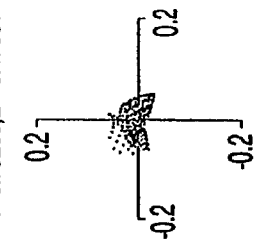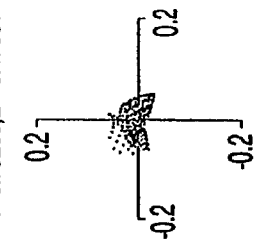

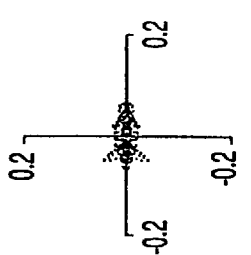
FIG. 16o
Y=4.79371e-20,Z=-6.47118
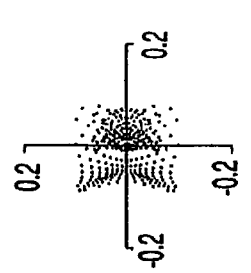
FIG. 16n
Y=1.34224e-18,Z=-12.8268
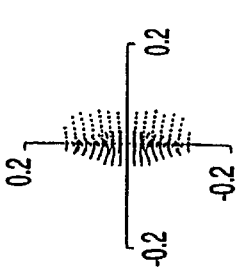
FIG. 16r
Y=-1.72574e-18,Z=-12.8777
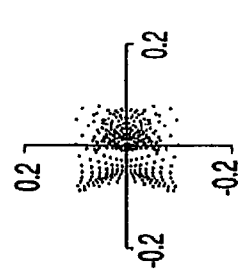
FIG. 16m
Y=3.69786,Z=12.86
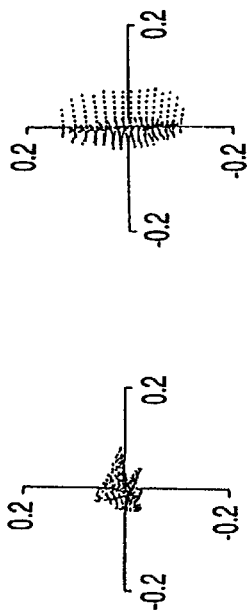
FIG. 16q
Y=-3.83497e-19,Z=6.36269
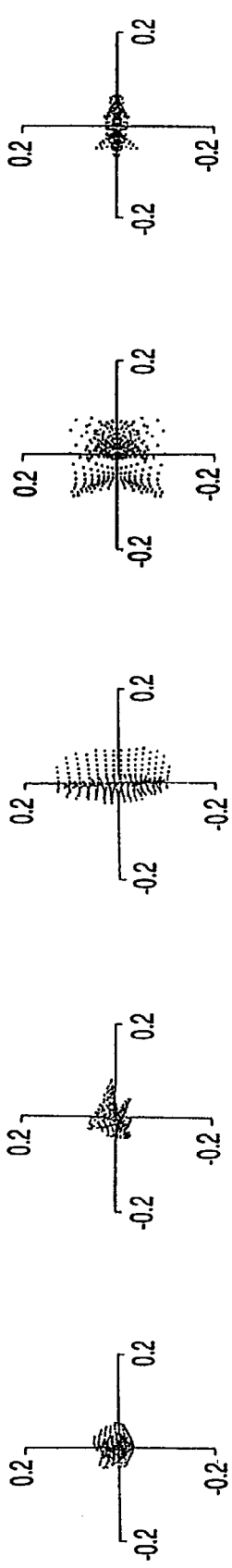
FIG. 16l
Y=3.65118,Z=6.33907
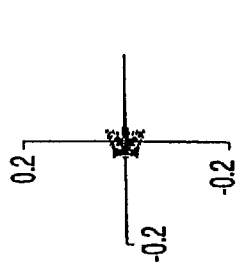
FIG. 16p
Y=1.91748e-19,Z=0.00170492
FIG. 16k
Y=3.67686,Z=-0.01665

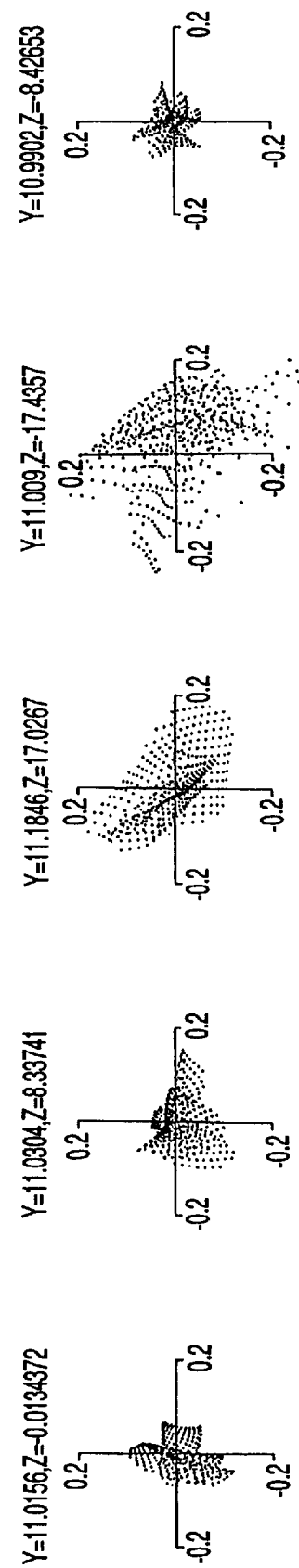
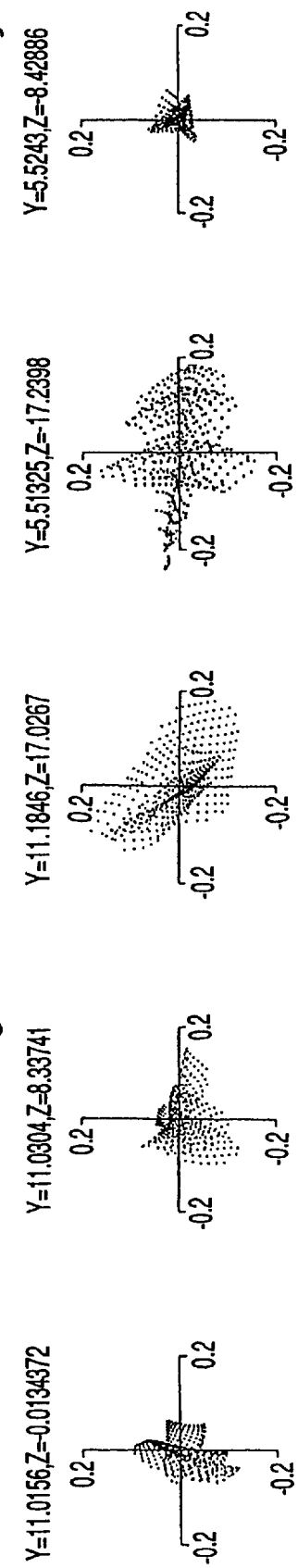

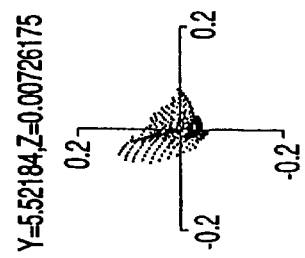
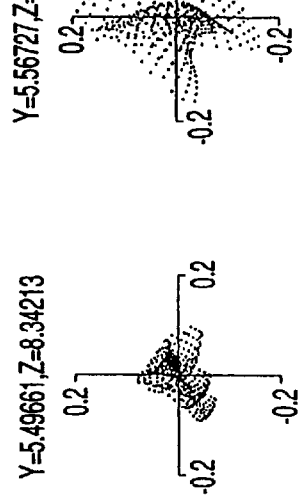
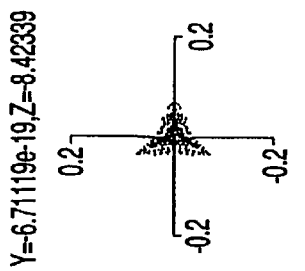
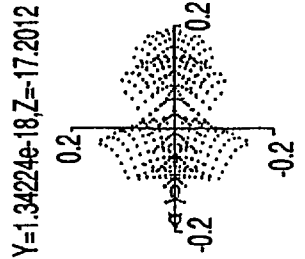
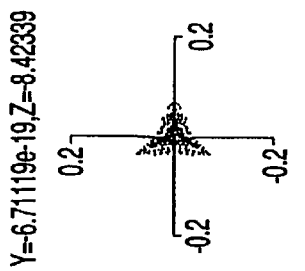
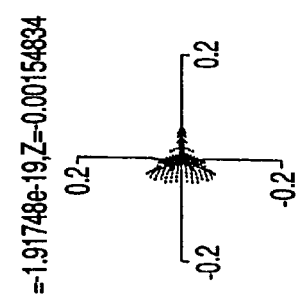
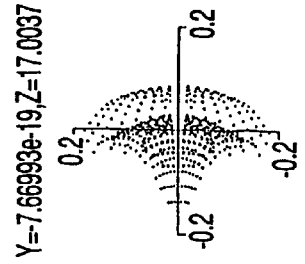
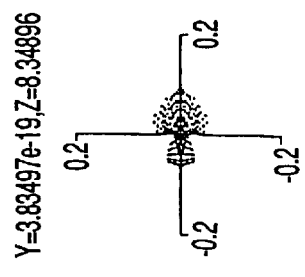

VIEWFINDER OPTICAL SYSTEM

This application is a division of application Ser. No. 09/228,685, filed Jan. 12, 1999 now U.S. Pat. No. 6,122,454, claiming priority from applications Nos. H10-004681, H10006377, H10-006380, H10-006387 and H10-006398 filed in Japan, the contents of which are hereby incorporated by reference.

RELATED APPLICATION

BACKGROUND OF THE INVENTION

1. Field of the Invention

The present invention relates to an optical system constituting a viewfinder of a camera and the like.

2. Description of the Prior Art

Various technologies as shown below have been disclosed to improve the performance of an optical system for displaying images. For example, as described in Japanese Laid-open Patent Application No. H8-292371, the entire optical system is formed in one block with a concave back-surface-reflecting mirror comprising an eyepiece optical system and a relay optical system which are integral with each other, thereby reducing the mirror optical system in size and lowering the disposition precision required of the reflecting mirror.

Moreover, as described in Japanese Laid-open Patent Application No. H7-234376, in order to correct the diopter of a picture display apparatus, at least one of the following optical elements is made movable: the display screen of the picture display apparatus; the optical surface of a relay optical system; the optical surface of a decentering correcting optical system; and the optical surface of an eyepiece optical system. Particularly, the reflecting surface of the eyepiece optical system is moved.

Moreover, as described in Japanese Laid-open Patent Application No. H9-222564, as an erecting optical system being compact compared with conventional erecting optical systems, an optical system has, between a principal ray parallelized lens and an eyepiece, two parabolic mirrors substantially sharing the focal point and the axis and being arranged so that the concave surfaces thereof face each other, and an image plane control lens having curvature of field in the vicinity of the focal point thereof.

However, the optical system as described in Japanese Laid-open Patent Application No. H8-292371 is difficult to manufacture because there are a plurality of reflecting surfaces in one block. The optical system as described in Japanese Laid-open Patent Application No. H7-234376 is difficult to adjust because a reflecting surface which is generally high in error sensitivity is moved. The optical system as described in Japanese Laid-open Patent Application No. H9-222564 is difficult to structure because the reflecting surface is limited to the parabolic surface.

SUMMARY OF THE INVENTION

In view of the above-mentioned problems, an object of the present invention is to provide a viewfinder optical system capable of effectively correcting aberrations and capable of performing diopter adjustment with little variation in magnification and little variation in aberration with a compact mechanism.

Another object of the present invention is to provide a viewfinder optical system in which an unnecessary luminous flux is limited to improve performance.

Yet another object of the present invention is to provide a compact, low-cost and high-performance viewfinder optical system.

Still another object of the present invention is to provide a compact and low-cost viewfinder optical system capable of effectively correcting aberrations.

BRIEF DESCRIPTION OF THE DRAWINGS

These and other objects and features of this invention will become clear from the following description, taken in conjunction with the preferred embodiments with reference to the accompanied drawings in which:

FIG. 8 is a view of the nonaxisymmetric optical system at the time of diopter adjustment (rotation, near side) (second embodiment);

FIG. 9 is a view of assistance in explaining movement for diopter adjustment of the nonaxisymmetric optical system (linear movement) (second embodiment);

FIGS. 11a–11o show spot diagrams of the nonaxisymmetric optical system using only axisymmetric lens elements (first embodiment);

FIGS. 12a–12r show spot diagrams of the nonaxisymmetric optical system (second embodiment);

FIGS. 13a–13r show spot diagrams of the nonaxisymmetric optical system (linear movement, far side) (second embodiment);

FIGS. 14a–14r show spot diagrams of the nonaxisymmetric optical system (linear movement, near side) (second embodiment);

FIGS. 15a–15r show spot diagrams of the nonaxisymmetric optical system (rotation, far side) (second embodiment);

FIGS. 16a–16r show spot diagrams of the nonaxisymmetric optical system (rotation, near side) (second embodiment);

FIGS. 26a–26r show spot diagrams of the nonaxisymmetric optical system (third embodiment);

DESCRIPTION OF THE PREFERRED EMBODIMENTS

In the specification, the terms "optical power" or "power" means a quantity which is defined by the reciprocal of a focal length, and includes not only the deflection in the faces of media having refractive indices of different deflection functions, but also the deflection due to diffraction, the deflection due to the distribution of refractive index in a medium, and the like. Furthermore, the term "refractive power" means a quantity which belongs to the above-mentioned "power", and which is particularly due to a deflection function generated in an interface between media having different refractive indices.

Hereinafter, embodiments of the present invention will be described with reference to the drawings. First, absolute coordinates are defined as follows: The origin of absolute coordinates (X, Y, Z)=(0, 0, 0) is set at the center of the design pupil. Here, X is vertical to the pupil surface and the direction of the light incident on the optical system from the point at the center of the pupil is positive. Z is a direction in which the optical system is decentered and that is situated on the pupil surface. Y is a coordinate vertical to X and Z. Local coordinates are represented by coordinates from the origin of the absolute coordinates and the angles of decentering from the X axis (decentering about the Y axis in the Z direction with the counterclockwise direction as the positive direction).

A nonaxisymmetric viewfinder optical system of the present invention is decentered only in the Z direction. Therefore, in the optical system of the present invention, the Y component is symmetrical on the X-Z plane (plane of Y=O). Tables 1 and 2 show the performance of the viewfinder optical system of each construction. The details of the constructions will be described later.

The viewfinder magnification is related not only to the magnification of the viewfinder optical system but also to the focal length of the objective lens system (taking lens system). Here, the viewfinder magnification is obtained by use of the value of the focal length F1 shown in the remarks column. In a decentered optical system, the lateral magnification in the decentering direction (here, Z direction) and the lateral magnification in the direction vertical to the decentering direction (here, Y direction) generally disagree with each other. Here, the viewfinder magnification is the average of the magnification in the Z direction and the magnification in the Y direction. The anamorphic ratio is the ratio between the magnifications in the Z and Y directions.

As is apparent from these tables, the optical systems of the present invention secure high magnifications as viewfinder optical systems. In addition, with the anamorphic ratio restrained to several percent or lower, the viewfinder optical systems have little distortion.

Figure 1:
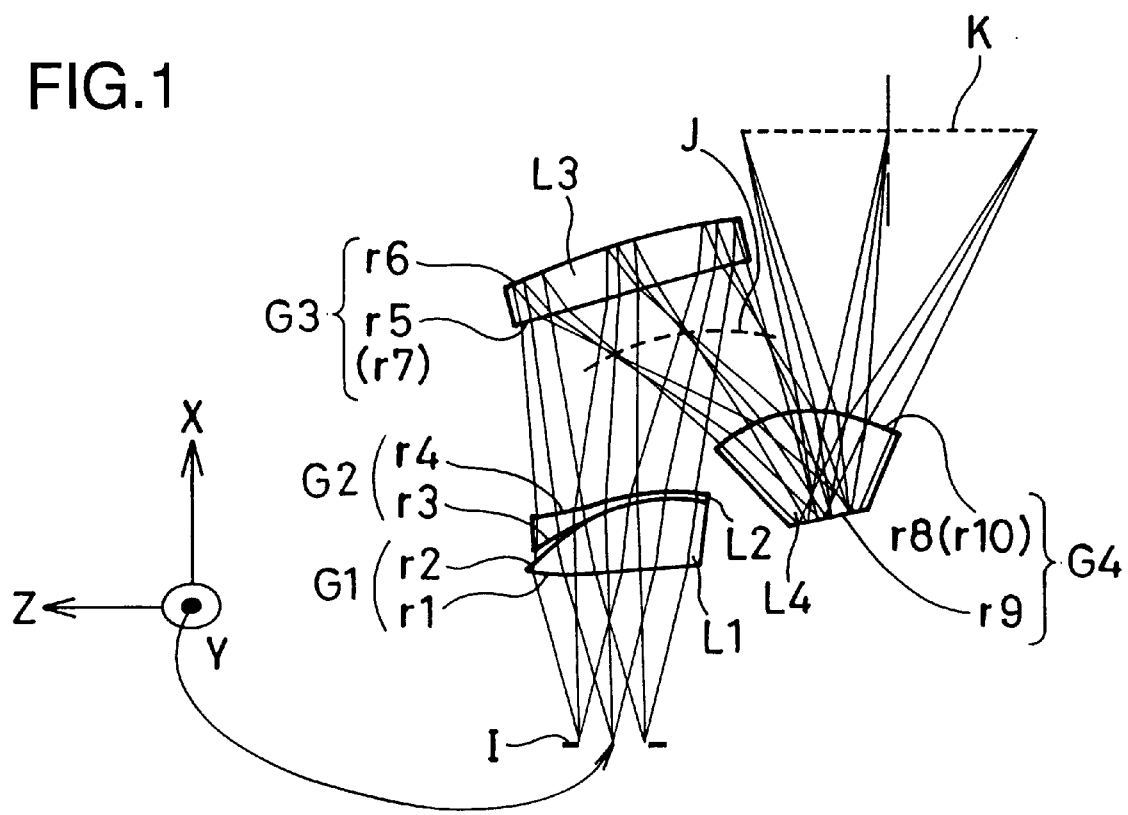
FIG. 1 is a view of a nonaxisymmetric optical system using only axisymmetric lens elements (first embodiment)

FIG. 1 shows a nonaxisymmetric optical system using only axisymmetric lens elements (arranged with their optical axes decentered from one another). The optical system of FIG. 1 is according to a first embodiment. As shown in the figure, light emanating from an image plane K is incident on a tenth surface r10 of a fourth lens unit G4 of a relay lens, is reflected at a ninth surface r9, and passes through an eighth surface r8 (the same as the tenth surface r10) to form a real image thereof on a relay image plane J. The fourth lens unit G4 comprises one lens element L4.

Figure 2:
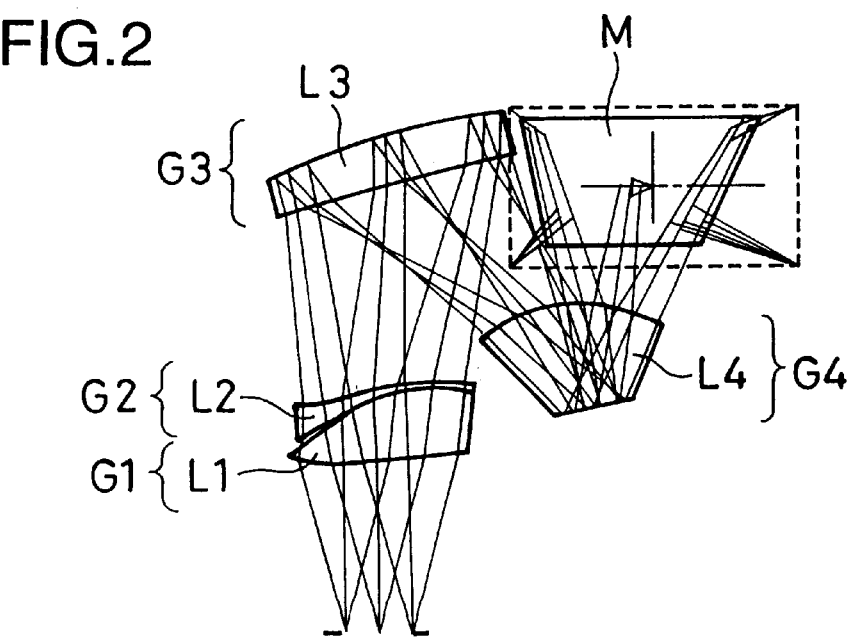
FIG. 2 is a view of a nonaxisymmetric optical system using only axisymmetric lens elements (with a mirror) (first embodiment)

An eyepiece unit comprises a third lens unit G3 having a positive optical power, a second lens unit G2 having a negative optical power and a first lens unit G1 having a positive optical power. The first, the second and the third lens units G1, G2 and G3 each comprise one lens element L1, L2 or L3. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. FIG. 2 shows an arrangement in which a mirror M is disposed immediately at the back of the image plane K.

Tables 3 and 4 show construction data and aspherical coefficients of the first embodiment, respectively. The coordinate system used here is shown in FIG. 1. With respect to the angle, the counterclockwise direction about the Y axis is the positive direction with the direction vector of the X axis as the reference. The Y coordinates of the surfaces are all 0. The coordinates and the angles of the surfaces are set at the coordinate references of the pupil surface I.

The radii of curvature of the surfaces shown in Table 3 are represented by the distances from the vertices to the centers of curvature of the surfaces by using as the references the direction vectors represented by the coordinate systems where the surfaces are situated and the angles. The surfaces for which no coordinate systems are defined are situated in positions advanced by the distances shown in the distance columns in the directions of the direction vectors shown in the preceding coordinate systems. The coordinates of the aperture diaphragm surface existing on the reflecting surface represents the central position of the diaphragm. The coordinate system is the same for other optical systems described later. In the tables, E-n (n is a number) represents x10-n.

The aspherical surfaces are expressed by the following expression:

$$\begin{cases} x = f(\Phi) = C_0 \Phi^2 / \left\{1 + \sqrt{(1 - \varepsilon C_0^2 \Phi^2)}\right\} + \sum_i^\infty A_i \Phi^i \\ \Phi^2 = y^2 + z^2 \end{cases}$$

where x is the displacement from the vertex of the aspherical surface in a direction parallel to the optical axis of the aspherical surface, Φ is the distance from the vertex of the aspherical surface in a direction vertical to the optical axis of the aspherical surface $\{=\sqrt{(y^2+z^2)}\}$, C0 is the curvature at the vertex of the aspherical surface, ε is the quadric surface parameter, and Ai is the i-th aspherical curvature.

Figure 3:
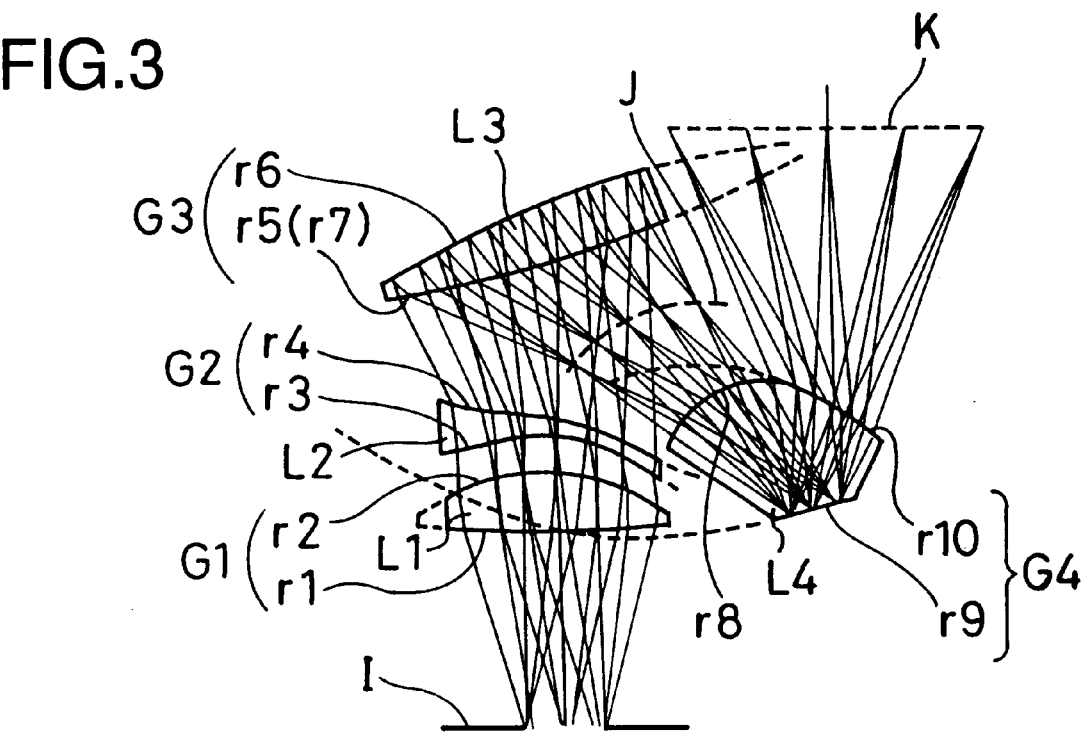
FIG. 3 is a view of a nonaxisymmetric optical system (second embodiment)

FIG. 3 shows a nonaxisymmetric optical system. The optical system of FIG. 3 is according to a second embodiment. As shown in the figure, light emanating from the image plane K is incident on a tenth surface r10 of a fourth lens unit G4 of a relay lens, is reflected at a ninth surface r9, and passes through an eighth surface r8 to form a real image thereof on a relay image plane J. The fourth lens unit G4 comprises one lens element L4.

Figure 4:
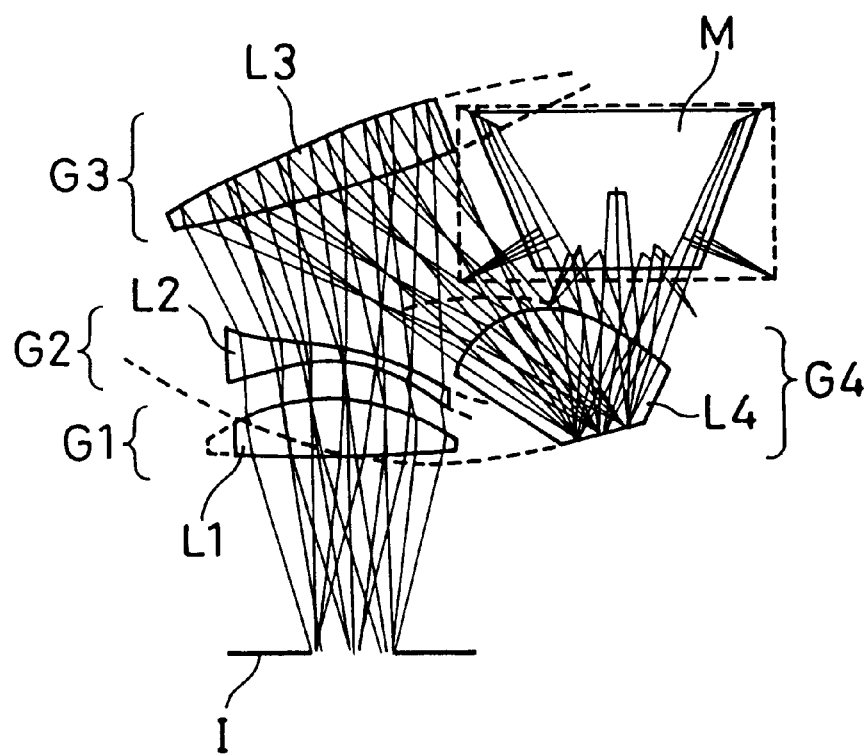
FIG. 4 is a view of a nonaxisymmetric optical system (with a mirror) (second embodiment)

An eyepiece unit comprises a third lens unit G3 having a positive optical power, a second lens unit G2 having a negative optical power and a first lens unit G1 having a positive optical power. The first, the second and the third lens units G1, G2 and G3 each comprise one lens element L1, L2 or L3. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. FIG. 4 shows an arrangement in which a mirror M is disposed immediately at the back of the image plane K.

Figure 10:
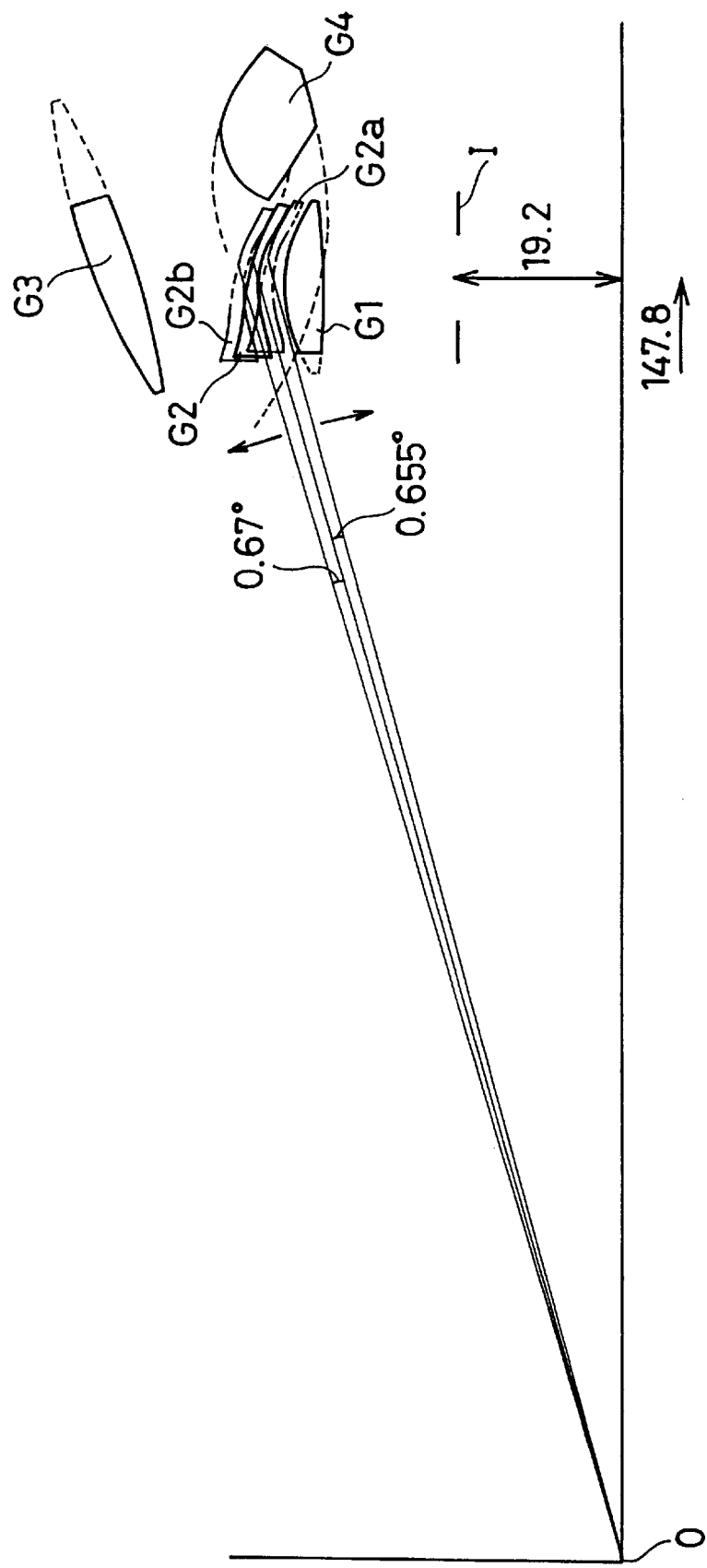
FIG. 10 is a view of assistance in explaining movement for diopter adjustment of the nonaxisymmetric optical system (rotation) (second embodiment)

Tables 5, 6 and 7 show construction data, construction data at the time when diopter adjustment is performed by rotation, and aspherical coefficients of the second embodiment, respectively. The coordinates of the second lens unit G2 at the time of diopter adjustment are as shown in Table 6. The coordinates correspond to a position of the second lens unit G2 having been rotated by −0.655° (the diopter near side) and by +0.67° (the diopter far side) about the Y axis with a point away from the coordinates of the image surface I by (x, z)=(−19.2, 147.8) as the center. This is shown in FIG. 10 described later.

Concrete structures of the above-mentioned constructions will be described. The tenth surface r10 inclines in the vicinity of the intersection of the tenth surface r10 and the eighth surface r8 so that the light incident on the tenth surface r10 is refracted in the Z direction (direction which is the direction of decentering and that approaches the pupil). When the tenth surface r10 is not arranged in such a manner, it is necessary for the decentering amount of the ninth surface r9 to be larger in order to prevent the light incident on the tenth surface r10 and the light incident on the eighth surface r8 from intersecting each other. Generally, the larger the decentering amount is, the larger the aberration caused by the decentering is, so that the performance deteriorates. Therefore, in order to reduce the decentering amount, the tenth surface r10 is arranged as mentioned above.

The ninth surface r9 comprises a reflecting surface so that the light from the tenth surface r10 is reflected toward the eighth surface r8. The reflecting surface of the ninth surface r9 can be formed by aluminum deposition. It is preferable for the ninth surface r9 to be situated in a position substantially conjugate with the pupil. With this, by limiting the reflecting range of the reflecting surface, a function as a diaphragm for intercepting unnecessary light can be provided, so that the image quality can be maintained excellent. Thus, the diaphragm is disposed at the ninth surface r9 in this embodiment.

Figure 28A:
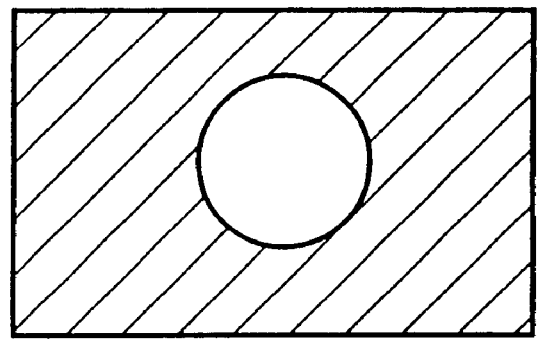
FIGS. 28A, 28B and 28C show the shapes of diaphragms provided at a reflecting surface.
Figure 28B:
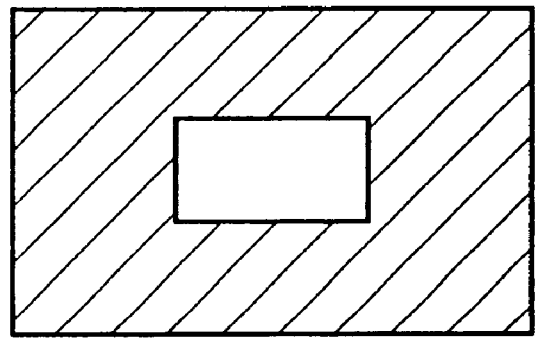
Figure 28C:
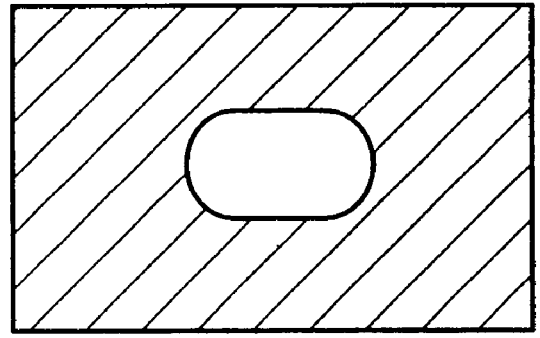

The diaphragm may be circular as shown in FIG. 28A or may be rectangular as shown in FIG. 28B. Moreover, the diaphragm may have an elliptic shape elongated in the horizontal direction as shown in FIG. 28C. With this, the size of the viewfinder optical system along the height can be reduced. In order to increase the image quality of the finder, it is also preferable for the diaphragm to have an elliptic shape elongated in the vertical direction.

As a concrete structure of the diaphragm, reflection is restrained in the hatched parts of FIGS. 28A to 28C, whereas reflection is facilitated in the blank parts. To restrain reflection, ink is applied so that light is absorbed, or a coating that increases the transmittance is applied. To facilitate reflection, the optical system is structured so as to achieve total reflection, or aluminum or silver is deposited to increase the reflectance. The reflectance may be increased by use of a multilayer dielectric film.

As a concrete value of the reflectance, when the reflectance within a reflection necessary range where reflection should be facilitated is Ri and the reflectance outside the reflection necessary range where reflection should be restrained is Ro, it is preferable that $Ri/Ro>10$.

With this, the influence of the unnecessary luminous flux outside the reflection necessary range can be made inconspicuous. In order to further improve the performance, it is preferable that $Ri>50\%$ and $Ro<5\%$.

It is preferable for the reflecting surface to be a concave reflecting surface having a positive optical power. With this, the image quality can be improved. It is preferable for the number of reflecting surfaces to be one. Although a plurality of reflecting surfaces are provided in some conventional examples, in the present invention, only one reflecting surface is provided in one lens unit. The reason therefor is as follows: Since a reflecting surface generally has an error sensitivity three to four times higher than that of a transmitting surface, when a plurality of reflecting surfaces are provided, the error caused at the time of assembly increases, so that manufacture is difficult. The optical systems of the present invention are easy to manufacture because only one reflecting surface is provided.

The eighth surface r8 comprises a surface convex to the relayed image plane K. The tenth surface r10 and the eighth surface r8 both have a positive optical power here. Thus, it is preferable for at least one of the incident and the exit surfaces to have a positive optical power. With this, the positive optical power necessary as a relay optical system can be dispersed, so that the aberration performance can be improved. Thus, by forming a single lens element in which the incident and the exit surfaces have different curvatures and the incident luminous flux is reflected at the reflecting surface having a further different curvature, a compact and low-cost relay optical system can be structured.

When the Abbe number of the single lens element to the d-line is vd, it is preferable that $30<vd<70$.

When the Abbe number is great, color dispersion is small and variation in image quality due to the wavelength of the ray is small, so that it is easy to secure the necessary performance. However, when the Abbe number is too great, the material is expensive and the processing by molding is difficult, so that the cost increases.

When the radius of curvature of the reflecting surface is CR, it is preferable that $|CR|<100$.

With this, a positive optical power necessary for the reflecting surface can be provided, so that the performance can be improved.

The third lens unit G3 comprises a back-surface-reflecting lens in which the sixth surface r6 is the reflecting surface, and is disposed so as to be inclined so that the light coming from the eighth surface r8 exits toward the eyepiece. Here, the sixth surface r6 is a reflecting surface having a positive optical power. Generally, when the focal length is the same, a back-surface-reflecting surface can have a gentle radius of curvature compared with a front-surface-reflecting surface, so that excellent performance can be secured. While the lens element comprises an axisymmetric lens element (lens in which the optical axes of the seventh surface r7 and the sixth surface r6 coincide with each other), it may comprise a decentered lens as necessary.

When the radius of curvature of the reflecting surface is CR, it is preferable that $|CR|<200$.

With this, positive power can be appropriately distributed to the reflecting surface, so that necessary image quality can be secured.

The remaining two lens units of the eyepiece are a second lens unit G2 including at least one surface having a negative optical power and a first lens unit G1 including at least one surface having a positive optical power. Here, when the Abbe number to the d-line is vd, it is preferable to use for the lens element of the second lens unit G2 a lens material having an Abbe number such that 20<vd<40.

Thus, by selecting a material with large dispersion, chromatic aberration can be effectively corrected. The material may be a plastic material or may be a glass material.

By the third surface r3 of the second lens unit G2, i.e. the last surface (the most pupil side surface) of the second lens unit G2 being a surface having a negative optical power (i.e. a surface convex to the side of the image plane K), excellent performance can be secured even when diopter adjustment is performed.

Figure 5:
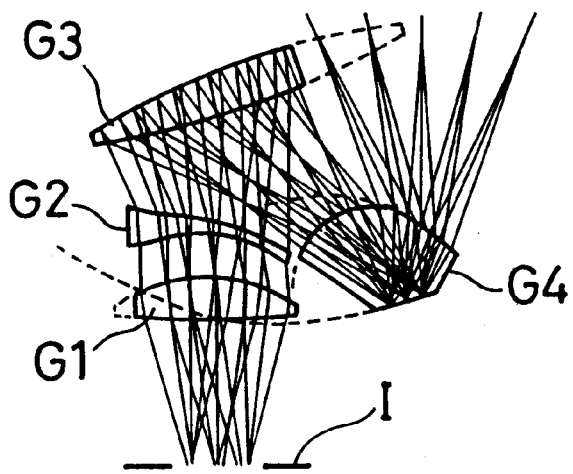
FIG. 5 is a view of the nonaxisymmetric optical system at the time of diopter adjustment (linear movement, far side) (second embodiment)
Figure 6:
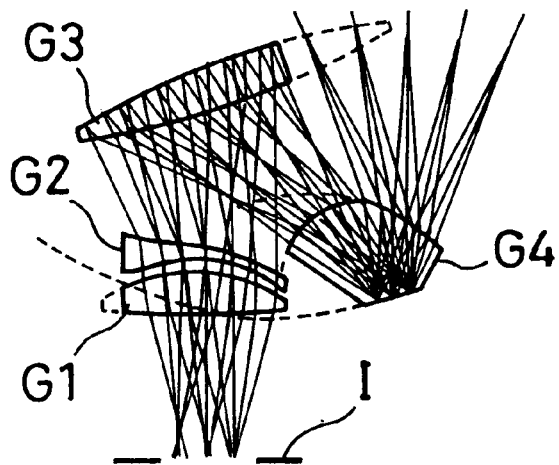
FIG. 6 is a view of the nonaxisymmetric optical system at the time of diopter adjustment (linear movement, near side) (second embodiment)

By the second lens unit G2 being movable, diopter adjustment can be effectively performed. That is, by the second lens unit G2 being movable, an optical system is obtained in which variation in viewfinder magnification is small and variation in aberration is small. When the second lens unit G2 is moved, it is preferable to move it linearly in order to simplify the mechanism for moving it. FIGS. 5 and 6 illustrating the nonaxisymmetric optical system at the time of the diopter adjustment, show the second lens unit G2 of the second embodiment moved toward the far side and toward the near side, respectively. FIGS. 5 and 6 represent the diopter far side and the diopter near side, respectively.

At this time, by moving the second lens unit G2 in a direction substantially parallel to the angle at which the ray from the center of the image plane to the center of the pupil is incident on this lens unit as shown in FIG. 9, effective diopter adjustment with little variation in aberration can be performed. It is preferable for the angle to be substantially 10° or smaller. The positions of the second lens unit G2 on the near. side and on the far side in this arrangement are represented by G2a and G2b, respectively.

Tables 8, 9 and 10 show construction data, construction data at the time of diopter adjustment and aspherical coefficients when diopter adjustment is performed by linearly moving the second lens unit G2 in the second embodiment. The diopter adjustment in this case is performed by linearly moving the second lens unit G2 as is apparent from the fact that the angles in the column of the coordinates are the same. The movement direction at the time of diopter adjustment is inclined by 16.6° from the X axis. The angle at which the ray from the center of the image plane to the center of the pupil is incident on the second lens unit is 7.19°. The difference between the angles (here, 7.19° and 16.6°) is preferably small because the smaller the difference is, the more excellent the diopter adjustment performance is. When the angle difference is a, it is preferable that 0°<a<20°.

Tables 8 and 10 correspond to Tables 5 and 7.

Figure 7:
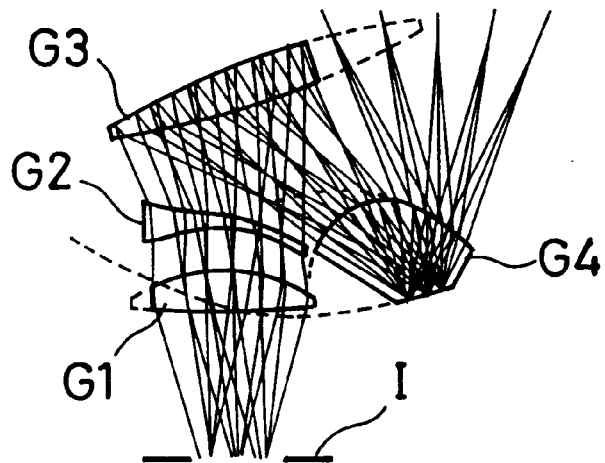
FIG. 7 is a view of the nonaxisymmetric optical system at the time of diopter adjustment (rotation, far side) (second embodiment)

The second lens unit G2 may be rotated instead of being linearly moved. FIGS. 7 and 8 illustrating the nonaxisymmetric optical system at the time of the diopter adjustment, show the second lens unit G2 of the second embodiment moved toward the far side and toward the near side, respectively. At this time, by rotating the second lens unit G2 about a center 0, i.e. an axis vertical to a plane including the ray from the center of the image plane to the center of the pupil as shown in FIG. 10, diopter adjustment with little variation in aberration can be performed like in the arrangement in which the second lens unit Gr2 is linearly moved. The positions of the second lens unit G2 on the near side and on the far side in this arrangement are represented by G2a and G2b, respectively.

When the rotation angle of the lens that is rotated at the time of diopter adjustment is b, it is preferable that 0°<b<5°.

With this, diopter adjustment can be performed while excellent image performance is maintained.

In the case of a normal axisymmetric optical system, diopter adjustment is performed by moving the second lens unit G2 in the direction of the optical axis, whereas in the case of a nonaxisymmetric optical system, although the axis serving as the reference is not so clear, diopter adjustment can be performed by moving the second lens unit G2 in a direction substantially the same as the angle of the ray from the image plane to the center of the human pupil which ray is incident on the second lens unit G2. The diopter adjustment can be performed not only by parallelly moving the second lens unit G2 but also by rotating it about a point.

The lens element of the second lens unit G2 having a negative optical power plays an important role in correcting chromatic aberration. Generally, chromatic aberration is not a problem in a catoptric optical system but is a problem in a dioptric optical system. Chromatic aberration is also a problem in a catadioptric optical system like the one of the present invention. Here, by using a material with a small Abbe number for the second lens unit G2, chromatic aberration is effectively corrected. While the first lens unit G1 comprises an axisymmetric lens element (lens in which the optical axes of the second surface r2 and the first surface r1 coincide with each other), it may comprise a decentered lens as necessary.

FIGS. 11 to 16 shows spot diagrams of the optical systems of the embodiments:

FIGS. 11a–11o show spot diagrams of the nonaxisymmetric optical system using only axisymmetric lens elements (first embodiment);

FIGS. 12a–12r show spot diagrams of the nonaxisymmetric optical system (second embodiment);

FIGS. 13a–13r show spot diagrams of the nonaxisymmetric optical system (linear movement, far side) (second embodiment);

FIGS. 14a–14r show spot diagrams of the nonaxisymmetric optical system (linear movement, near side) (second embodiment);

FIGS. 15a–15r show spot diagrams of the nonaxisymmetric optical system (rotation, far side) (second embodiment); and FIGS. 16a–16r show spot diagrams of the nonaxisymmetric optical system (rotation, near side) (second embodiment).

The pupil diameter is 4 mm in all of these cases. These figures show spot diagrams on the image plane K when ray is incident thereon from the pupil.

Figure 17:
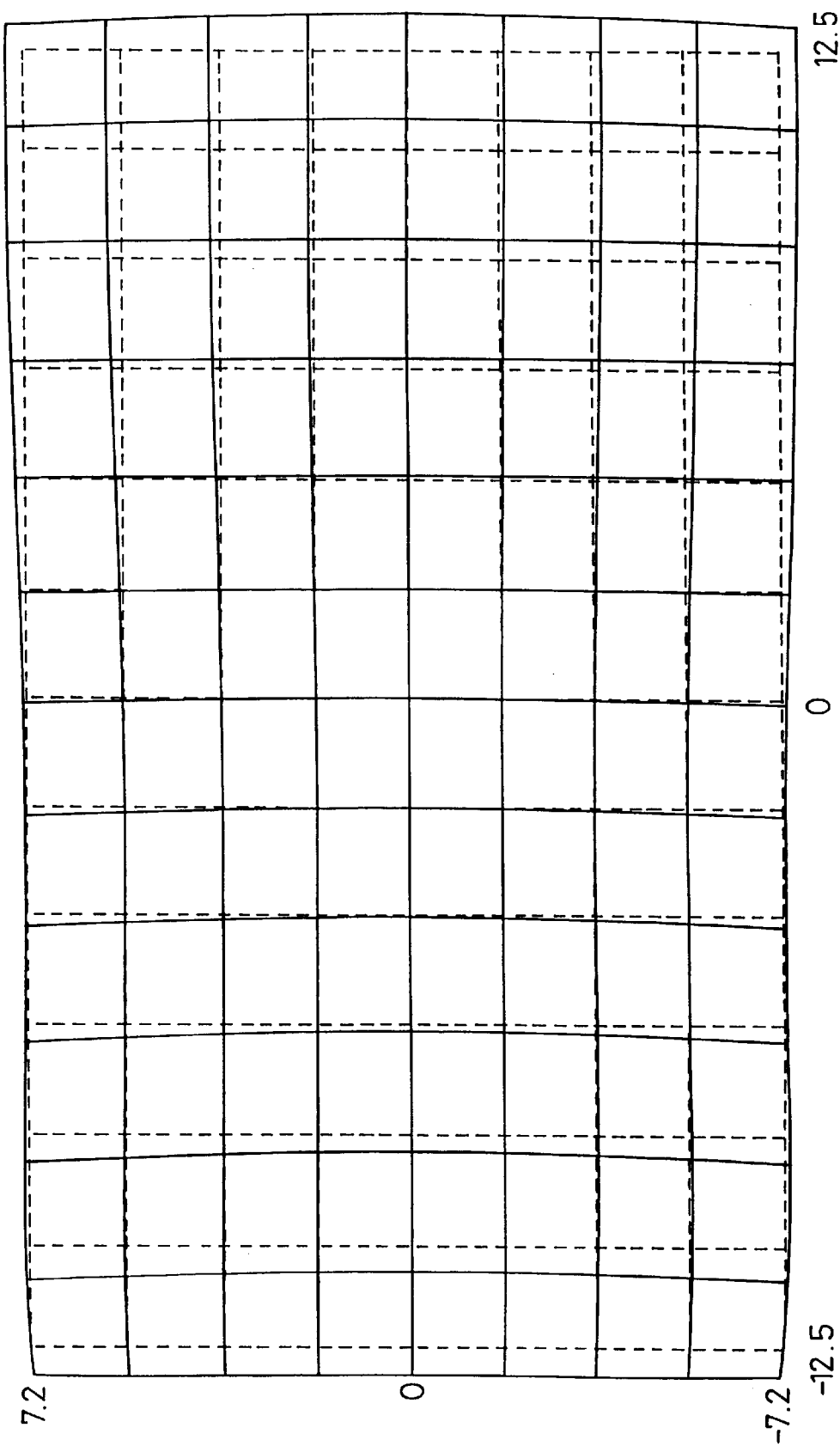
FIG. 17 is a representation of distortion of the nonaxisymmetric optical system using only axisymmetric lens elements (first embodiment)
Figure 18:
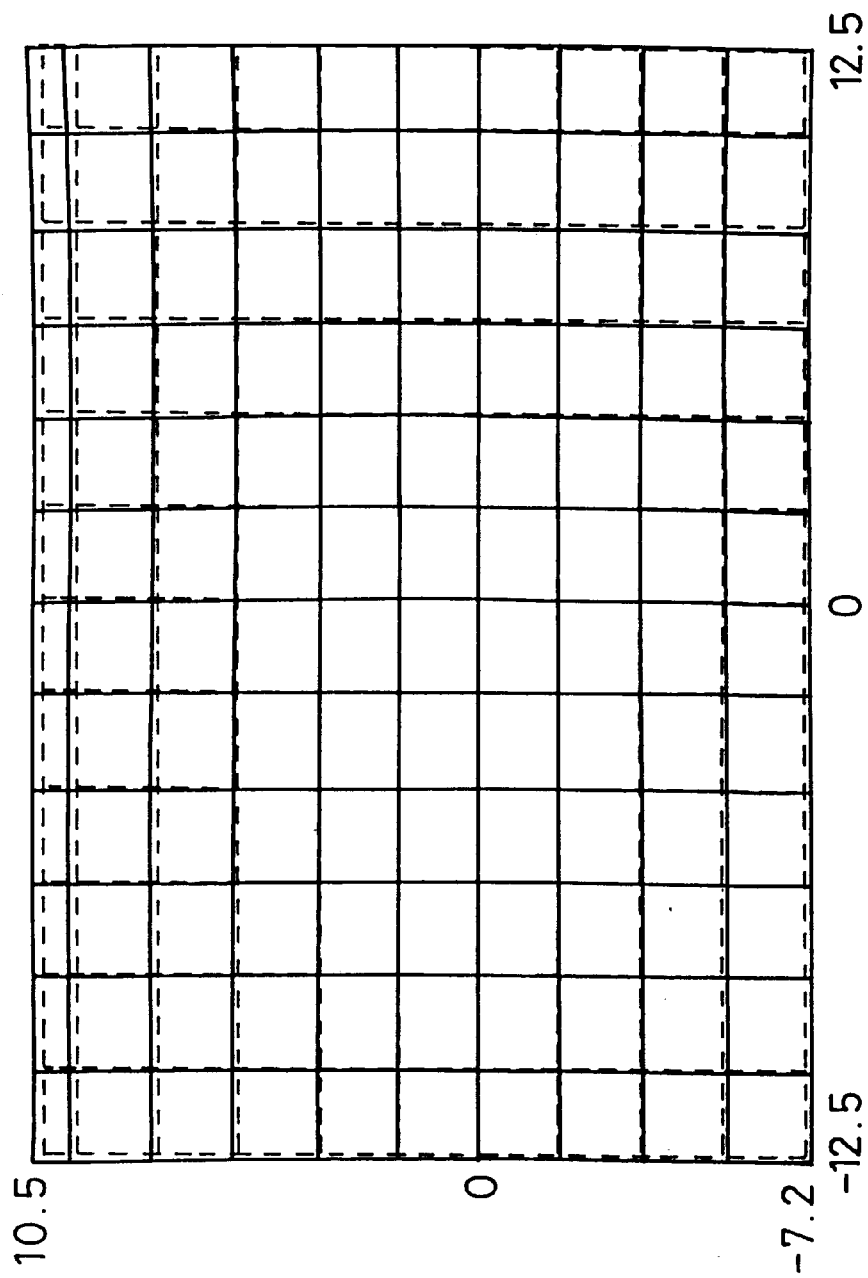
FIG. 18 is a representation of distortion of the nonaxisymmetric optical system (second embodiment)
Figure 19:
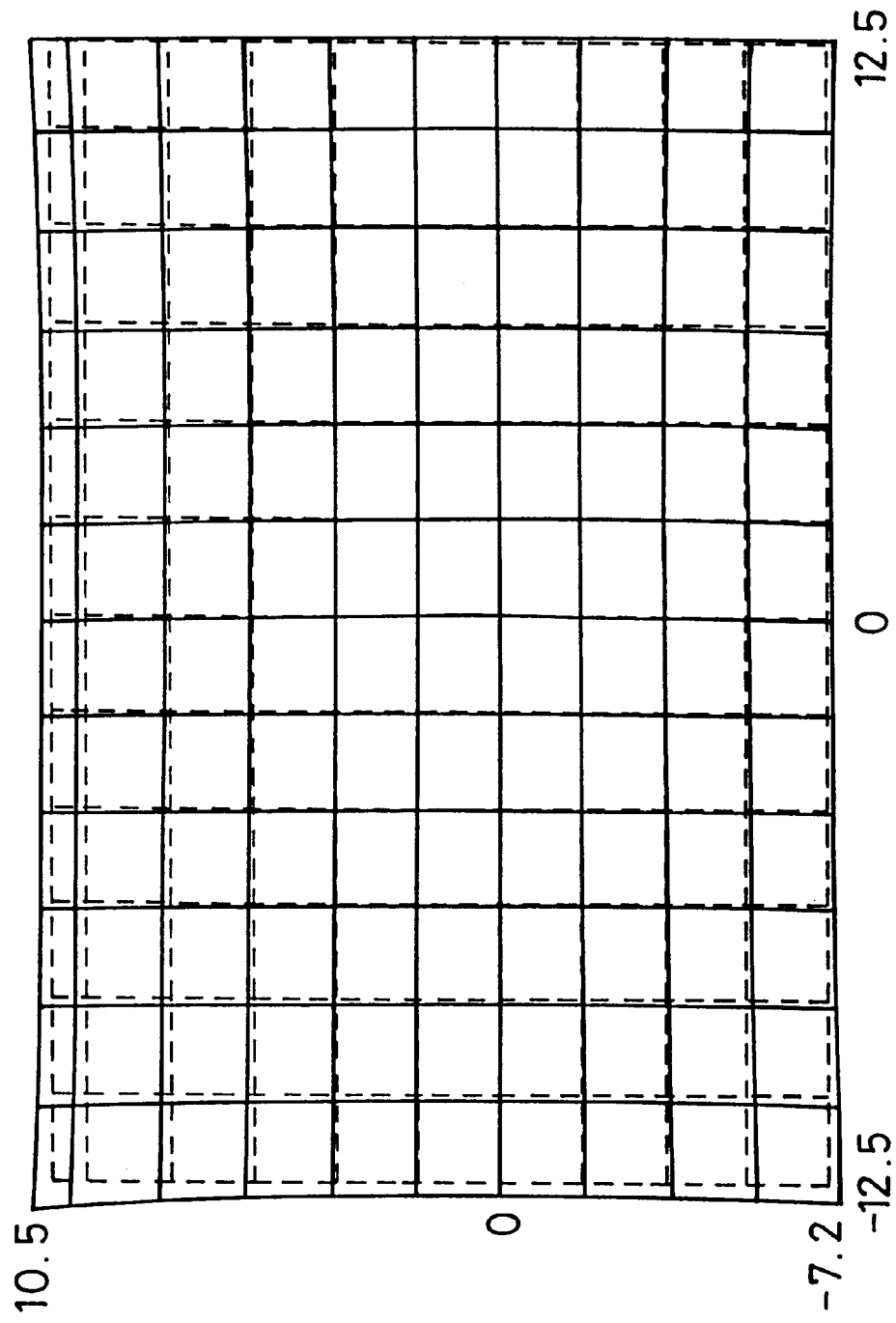
FIG. 19 is a representation of distortion of the nonaxisymmetric optical system (linear movement, far side) (second embodiment)
Figure 20:
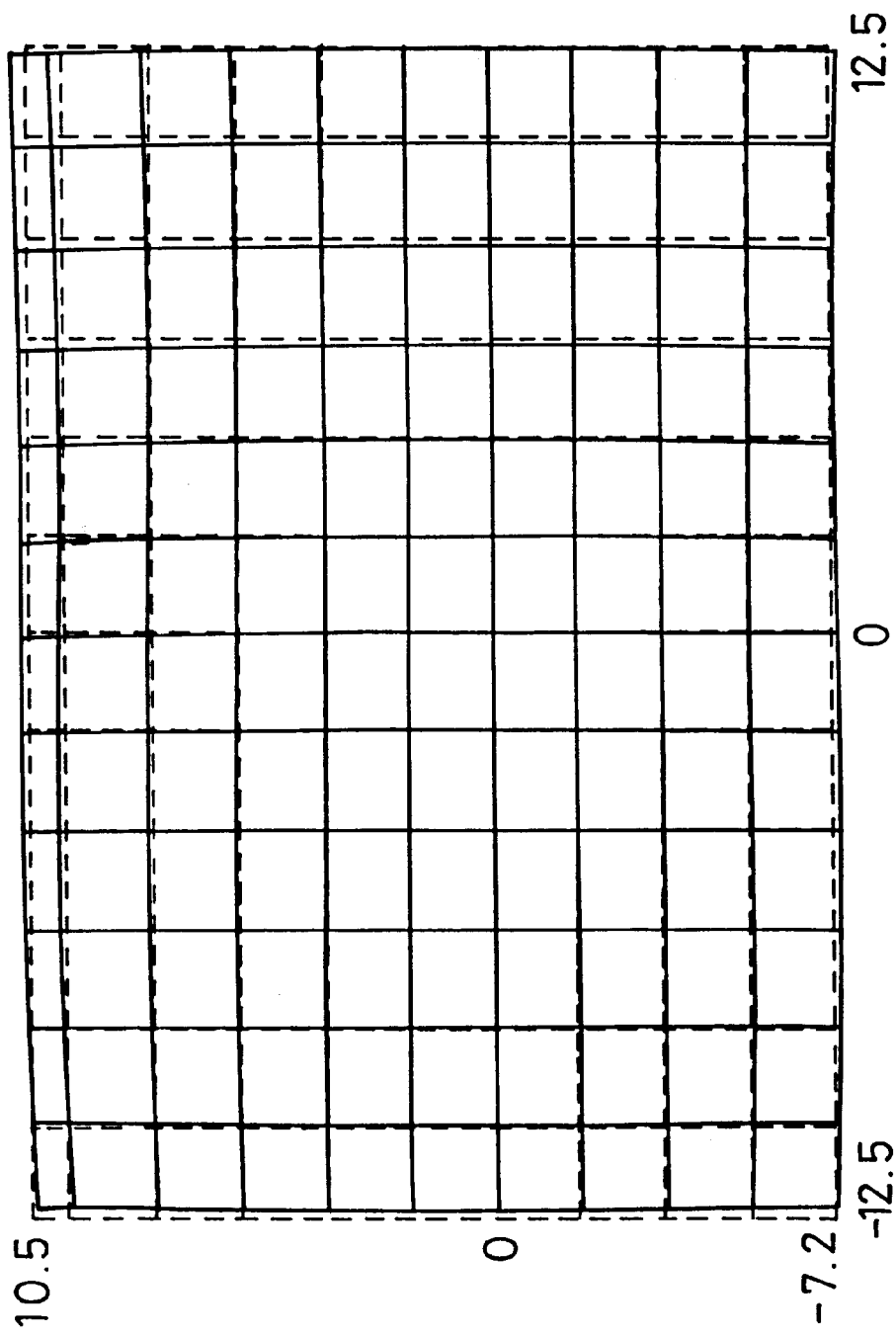
FIG. 20 is a representation of distortion of the nonaxisymmetric optical system (linear movement, near side) (second embodiment)
Figure 21:
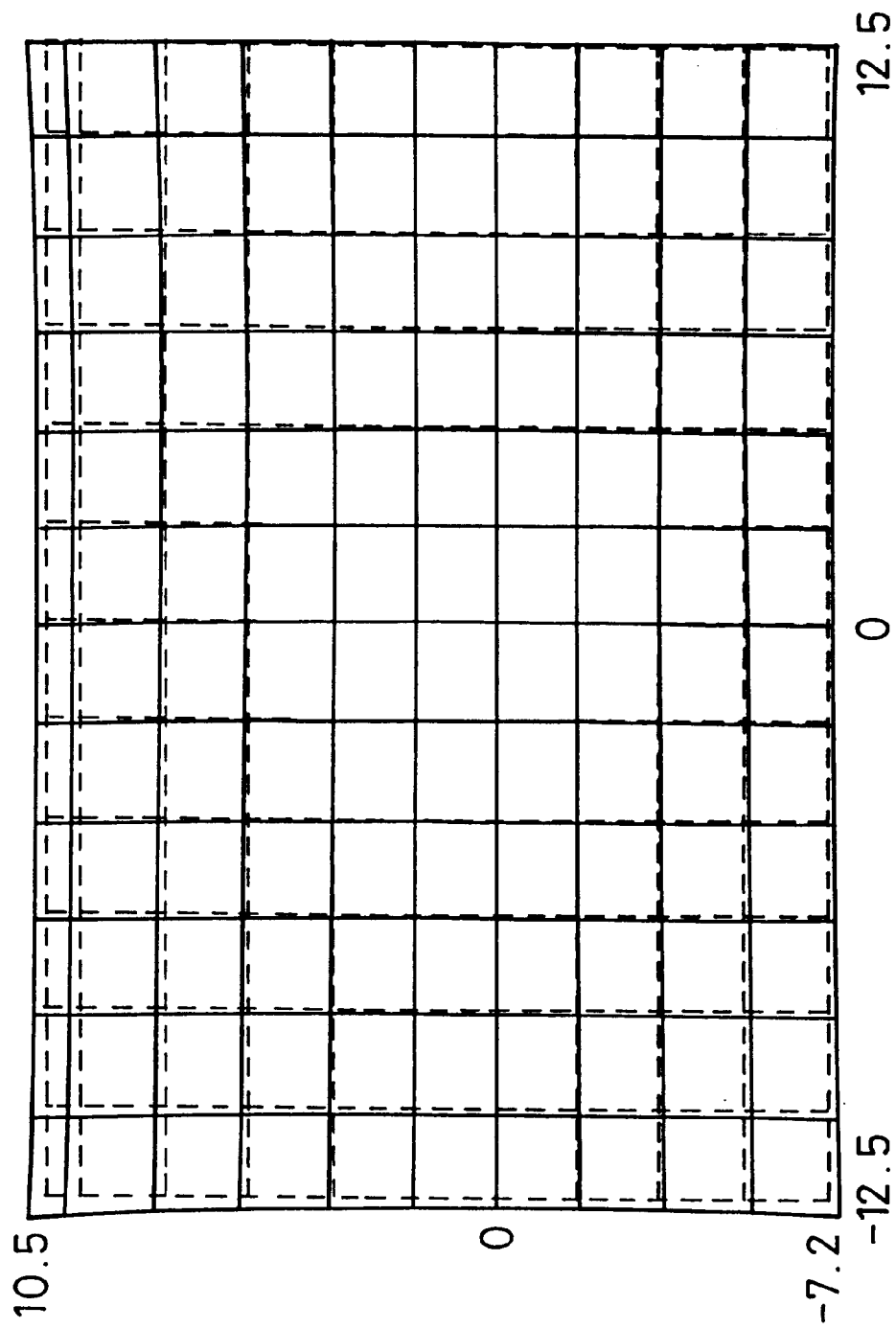
FIG. 21 is a representation of distortion of the nonaxisymmetric optimal system (rotation, far side) (second embodiment)
Figure 22:
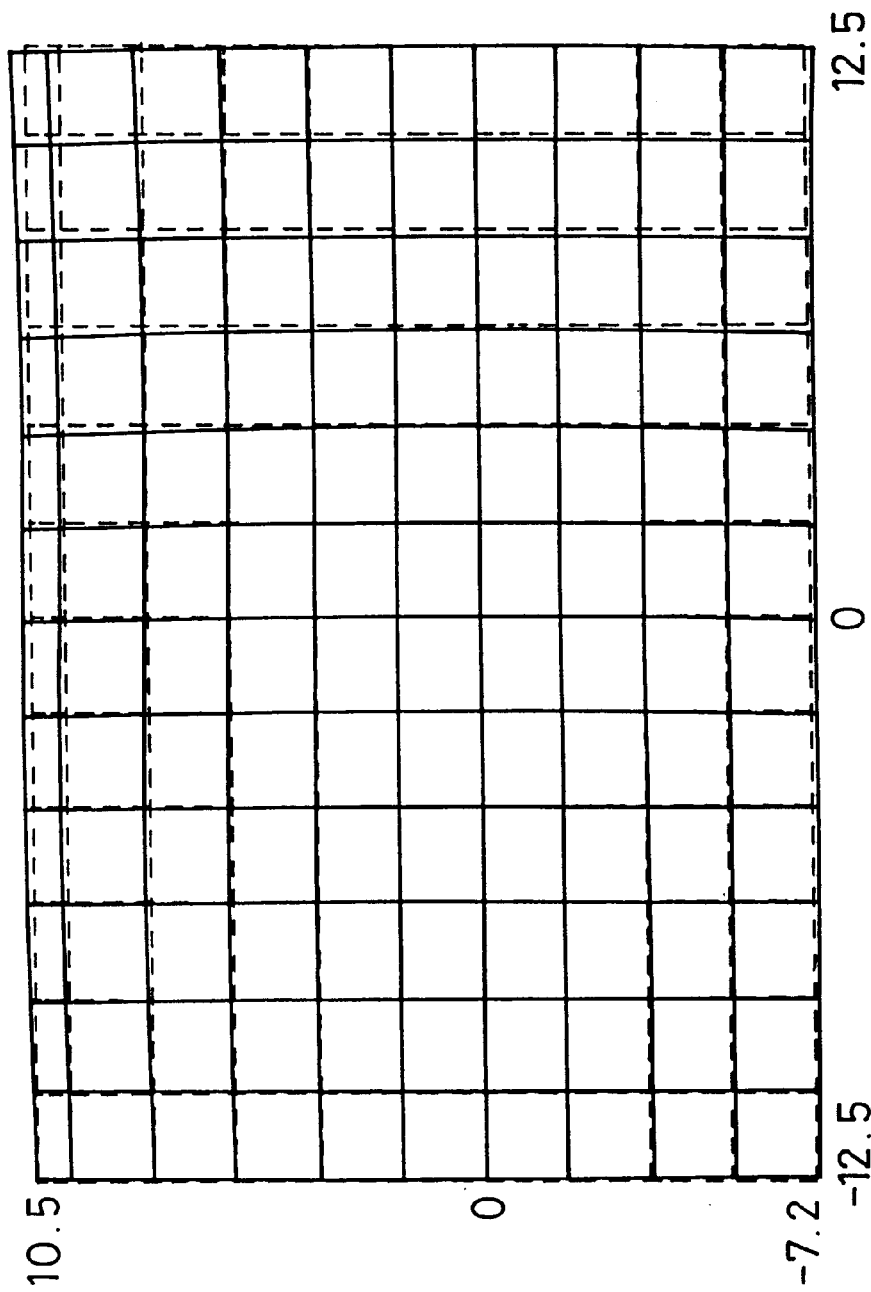
FIG. 22 is a representation of distortion of the nonaxisymmetric optical system (rotation, near side) (second embodiment)

FIGS. 17 to 22 are representations of distortion of the optical systems of the embodiments:

FIG. 17 is a representation of distortion of the nonaxisymmetric optical system using only axisymmetric lens elements (first embodiment);

FIG. 18 is a representation of distortion of the nonaxisymmetric optical system (second embodiment);

FIG. 19 is a representation of distortion of the nonaxisymmetric optical system (linear movement, far side) (second embodiment);

FIG. 20 is a representation of distortion of the nonaxisymmetric optical system (linear movement, near side) (second embodiment);

FIG. 21 is a representation of distortion of the nonaxisymmetric optical system (rotation, far side) (second embodiment); and FIG. 22 is a representation of distortion of the nonaxisymmetric optical system (rotation, near side) (second embodiment). In these figures, distortion is evaluated by the exit angle of the ray on the pupil when the ray is incident thereon from the image plane K. These figures all show that the optical systems are sufficiently practical.

Figure 23A:
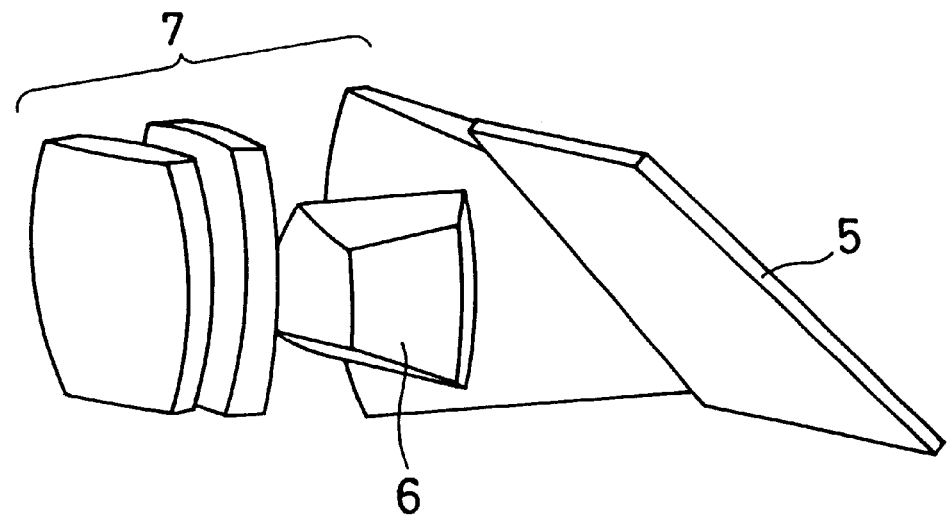
FIGS. 23A and 23B are perspective views of the nonaxisymmetric optical system (only a viewfinder optical system) (second embodiment)
Figure 23B:
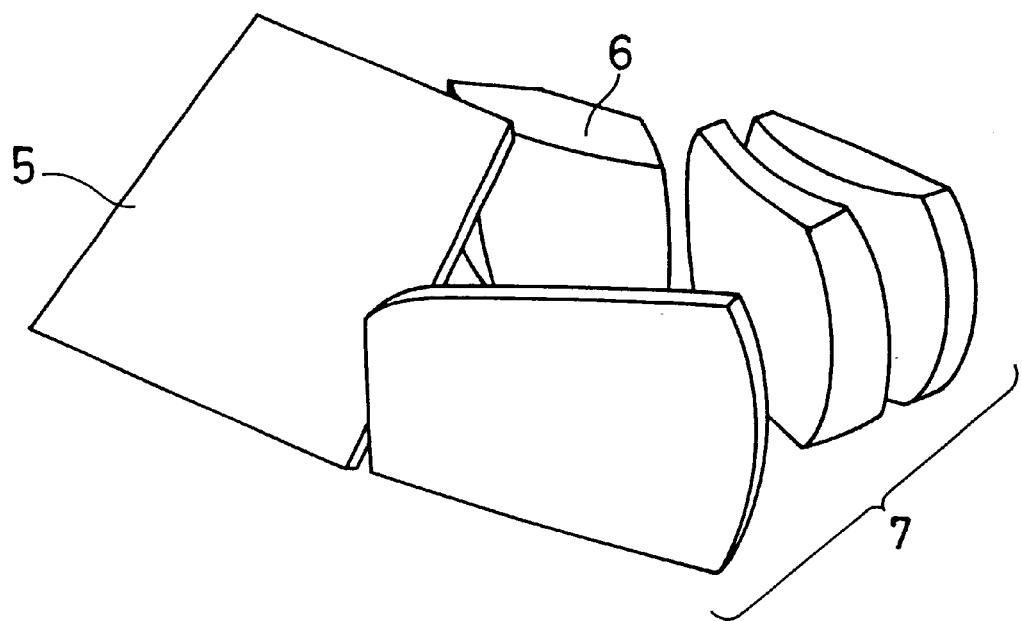
Figure 24:
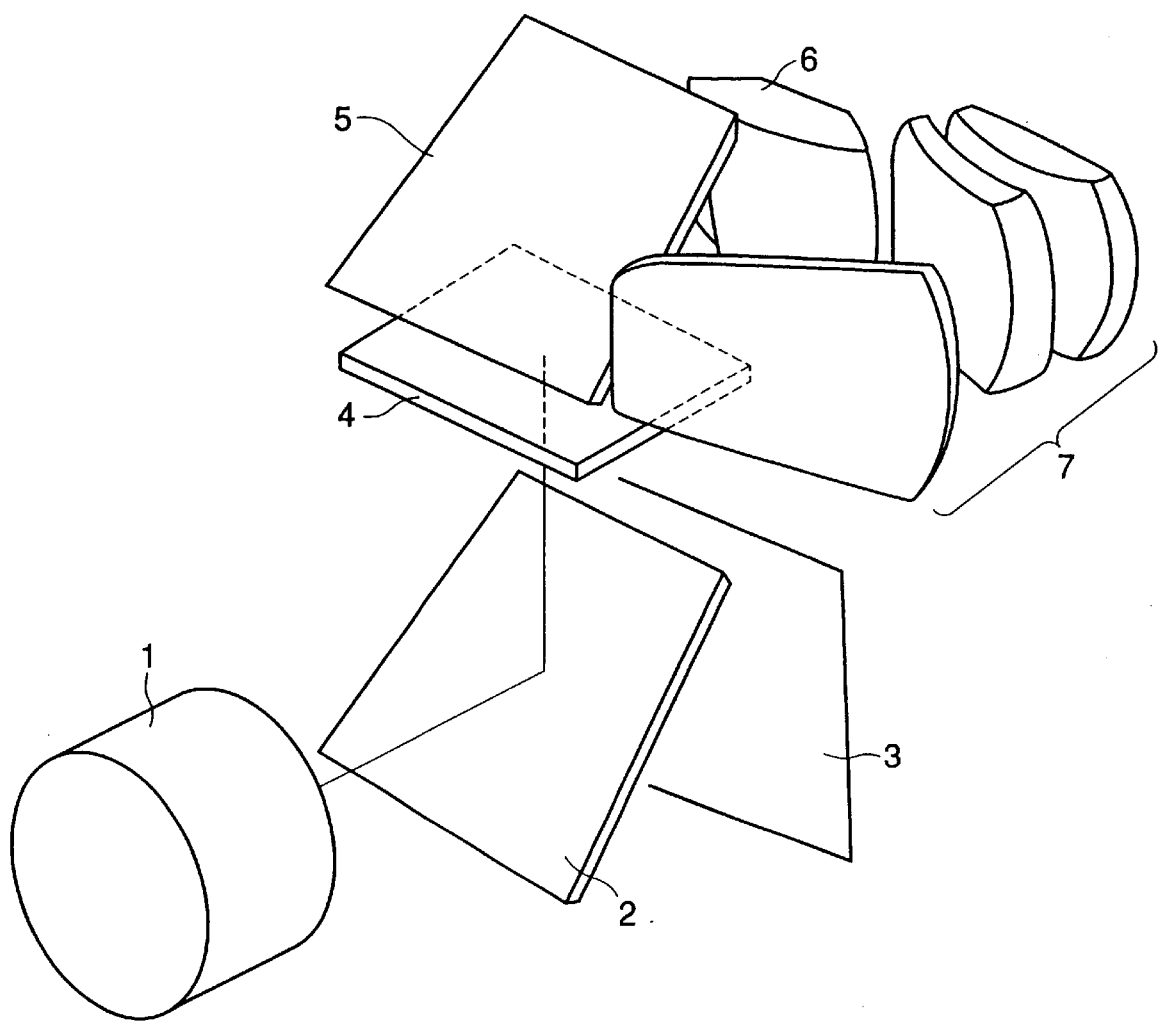
FIG. 24 is a perspective view of the nonaxisymmetric optical system (entire optical system) (second embodiment)

FIGS. 23A and 23B are perspective views showing only the viewfinder optical system of the nonaxisymmetric optical system of the second embodiment. FIG. 23A shows the rear side, whereas FIG. 23B shows the front side. FIG. 24 is a showing the entire optical system in a camera. In the figure, a luminous flux from a non-illustrated subject passes through a taking lens 1 to reach a half mirror 2. The luminous flux having passed through the half mirror 2 is imaged at a film plane 3 and the luminous flux reflected at the half mirror 2 is imaged at the focusing screen 4. The luminous flux from the image formed at the focusing screen 4 is reflected at a mirror 5 to be relayed to a relay lens unit 6, and passes through an eyepiece unit 7 to reach a non-illustrated pupil, thus acting as a finder.

Figure 25:
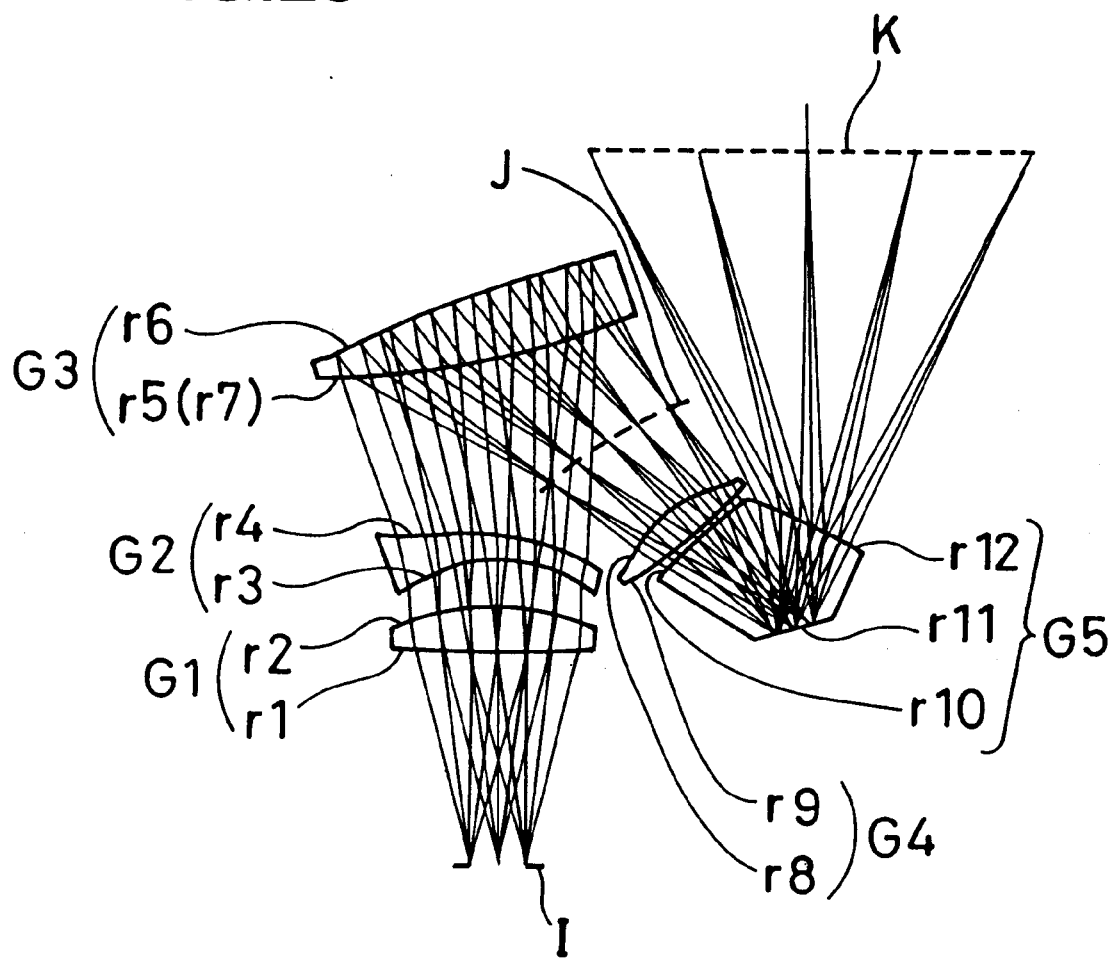
FIG. 25 is a view of a nonaxisymmetric optical system (third embodiment)

FIG. 25 shows a nonaxisymmetric optical system according to a third embodiment. In this example, the optical system comprises five lens units. As shown in the figure, light emanating from the image plane K is incident on a twelfth surface r12 of a fifth lens unit G5 of a relay lens, is reflected at an eleventh surface r11, passes through a tenth surface r10, and passes through a ninth surface r9 and an eighth surface r8 of a fourth lens unit G4 to form a real image thereof on a relay image plane J. The fourth lens unit G4 and the fifth lens unit G5 each comprise one lens element.

An eyepiece unit comprises a third lens unit G3 having a positive optical power, a second lens unit G2 having a negative optical power and a first lens unit G1 having a positive optical power. The first, the second and the third lens units G1, G2 and G3 each comprise one lens element. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. Tables 11 and 12 show construction data and aspherical coefficients of the third embodiment, respectively.

Figure 27:
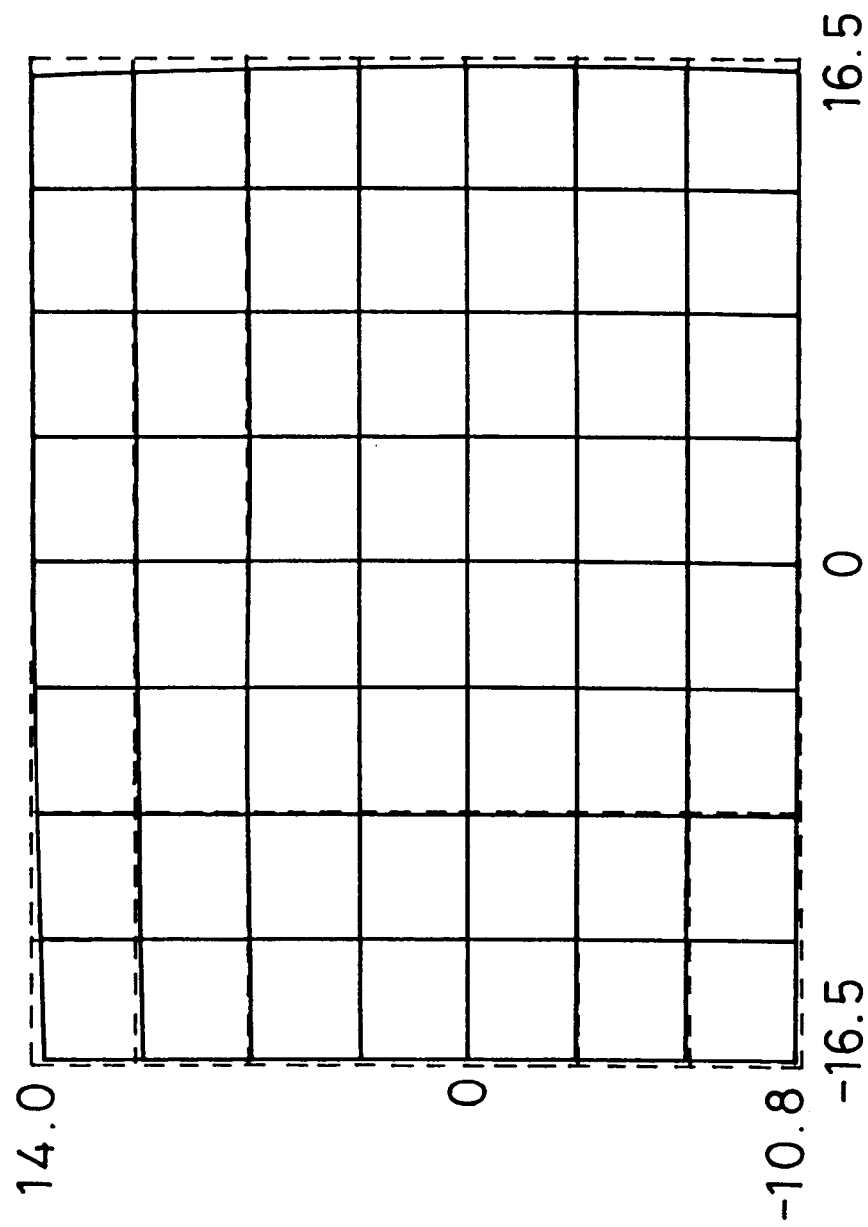
FIG. 27 is a representation of distortion of the nonaxisymmetric optical system (third embodiment)

FIGS. 26*a*–26*r* and 27 show spot diagrams and representations of distortion of the nonaxisymmetric optical system of the third embodiment. These figures both show that the optical system is sufficiently practical.

When a viewfinder of a relay optical system is formed, as is apparent from all the examples shown in the embodiments, an arrangement suitable for a viewfinder is obtained by providing the eyepiece with a greater number of lens elements than the relay optical system. This is because an optical system can be more easily arranged as a viewfinder and space efficiency is excellent when the space occupied by the eyepiece optical system is larger than that occupied by the relay optical system and because aberration correction by the eyepiece optical system is more efficient than aberration correction by the relay optical system.

Obviously, many modifications and variations of the present invention are possible in light of the above teachings. It is therefore to be understood that within the scope of the appended claims, the invention may be practiced other than as specifically described.

TABLE 1

| Construction | Central Diopter [Diopt.] | Finder Magnification | Anamorphic Ratio (Y/Z) | Remarks |
|---|---|---|---|---|
| 1st embodiment | −1.00 | 0.80 | −0.03 | Objective lens F1 = 40 mm |
| 2nd embodiment | −1.00 | 0.80 | −0.02 | Objective lens F1 = 40 mm |
| 3rd embodiment | −1.00 | 0.75 | 0.00 | Objective lens F1 = 50 mm |

TABLE 2

| Diopter adjustment Construction | Central diopter [Diopt.] | Finder Magnification | Anamorphic Ratio (Y/Z) | Remarks |
|---|---|---|---|---|
| 2nd embodiment | −1.00 | 0.80 | −0.02 | Objective lens F1 = 40 mm |
| 2nd embodiment Rotation, Near side | −3.25 | 0.79 | — | Objective lens F1 = 40 mm |
| 2nd embodiment Rotation, Far side | 1.25 | 0.81 | — | Objective lens F1 = 40 mm |
| 2nd embodiment Linear movement, Near Side | −3.34 | 0.79 | — | Objective lens F1 = 40 mm |
| 2nd embodiment Linear movement, Far Side | 1.25 | 0.81 | — | Objective lens F1 = 40 mm |

TABLE 3

| Name | | Coordinates | | Angle | | Radius of | Refractive Index | Abbe number |
|---|---|---|---|---|---|---|---|---|
| Unit | Surface | X | Z | [deg.] | Distance | curvature | Ne | νd |
| Pupil | I | 0.000 | 0.000 | 0.000 | | | | — |
| | | | | | | | 1 | |
| G1 | r1 | 15.434 | −4.848 | 5.104 | 6.048 | −4677.22 | 1.52729 | 56.38 |
| | r2 | | | | | −15.417 | | |
| | | | | | | | 1 | — |
| G2 | r3 | 21.699 | −5.120 | 2.328 | 0.485 | −15.018 | 1.62627 | 24.01 |
| | r4 | | | | | −22.275 | | |
| | | | | | | | 1 | — |
| G3 | r5 | 40.528 | −3.792 | 15.581 | | −171.546 | 1.52729 | 56.38 |
| | | | | | 4.504 | | | |
| | r6 | | | | | −58.021 | | |
| | r7 | | | (The same as r5) | | | | |
| | | | | | | | 1 | — |

TABLE 3-continued

| | Name | Coordinates | | Angle | Distance | Radius of curvature | Refractive Index Ne | Abbe number νd |
|---|---|---|---|---|---|---|---|---|
| Unit | Surface | X | Z | [deg.] | | | | |
| G4 | r8 | 29.184 | −15.932 | −170.214 | 9.711 | 10.397 | 1.52729 | 56.38 |
| | r9 | | | | | −55.109 | | |
| | r10 | (The same as r8) | | | | | 1 | — |
| Evaluation Surface | K | 54.384 | −24.952 | 0.000 | | — | | |

TABLE 4

Aspherical coefficient

| Surface | ε | A4 | A6 |
|---|---|---|---|
| r1 | 1 | −4.27E-06 | 2.90E-07 |
| r2 | 1 | −3.45E-05 | 5.66E-05 |
| r3 | 1 | 2.89E-05 | 4.26E-07 |
| r4 | 1 | 5.28E-05 | 2.83E-07 |
| r5 (r7) | 1 | 5.13E-05 | −2.84E-08 |
| r6 | 1 | 1.53E-05 | −8.12E-08 |
| r8 (r10) | 1 | −1.22E-04 | −1.99E-06 |
| r9 | 1 | 6.42E-05 | 1.22E-06 |

TABLE 6

Diopter adjustment construction

| | Name | Coordinates | | Angle |
|---|---|---|---|---|
| Unit | Surface | X | Z | [deg.] |
| G2 (Diopter near side) | r 3 N | 21.902 | −0.980 | −9.303 |
| | r 4 N | 22.688 | −2.189 | −17.254 |
| G2 (Diopter far side) | r 3 F | 25.331 | 0.011 | −7.978 |
| | r 4 F | 26.145 | −1.180 | −15.929 |

TABLE 5

| | Name | Coordinates | | Angle | Distance | Radius of curvature | Refractive Index Ne | Abbe number νd |
|---|---|---|---|---|---|---|---|---|
| Unit | Surface | X | Z | [deg.] | | | | |
| Pupil | I | 0.000 | 0.000 | 0.000 | | | | — |
| | | | | | | | 1 | |
| G1 | r1 | 16.000 | 1.300 | 0.000 | 4.7 | 95.261 | 1.49329 | 57.82 |
| | r2 | | | | | −14.773 | | |
| | | | | | | | 1 | — |
| G2 | r3 | 23.600 | −0.500 | −8.648 | | −11.714 | 1.62627 | 24.01 |
| | r4 | 24.400 | −1.700 | −16.599 | | −21.146 | | |
| | | | | | | | 1 | — |
| G3 | r5 | 39.250 | −3.800 | 19.453 | | 92.421 | 1.52729 | 56.38 |
| | | | | | 4.85 | | | |
| | r6 | | | | | −73.368 | | |
| | r7 | (The same as r5) | | | | | | |
| | | | | | | | 1 | — |
| G4 | r8 | 26.100 | −11.100 | −138.960 | | 7.587 | | |
| | | | | | | | 1.52729 | 56.38 |
| | r9 | 15.700 | −2.200 | 172.385 | | −26.178 | | |
| | Aperture diaphragm | 17.750 | −20.471 | 14.678 | | — | 1.52729 | 56.38 |
| | r10 | 28.950 | −15.100 | −10.857 | | −16.532 | 1.52729 | 56.38 |
| | | | | | | | 1 | — |
| Evaluation Surface | K | 48.900 | −21.990 | 0.000 | | — | | |

TABLE 7

Aspherical coefficient

| Surface | ε | A4 | A6 | A8 | A10 | A12 |
|---|---|---|---|---|---|---|
| r2 | 1 | 7.97E-05 | -2.02E-06 | 4.35E-08 | -4.08E-10 | 1.50E-12 |
| r3 | 1 | 1.54E-04 | 1.46E-06 | -1.33E-08 | 9.10E-11 | 6.08E-14 |
| r4 | 1 | 1.31E-04 | -1.71E-07 | 6.00E-09 | -4.96E-11 | 1.31E-13 |
| r5 (r7) | 1 | 1.29E-05 | 1.20E-07 | 2.18E-10 | 5.77E-13 | -1.47E-15 |
| r6 | 1 | 8.54E-06 | -3.81E-08 | 2.69E-11 | 1.99E-13 | -3.00E-16 |
| r8 | 1 | -1.12E-04 | -3.16E-05 | 1.52E-06 | -3.87E-08 | 3.30E-10 |
| r9 | 1 | 3.39E-05 | -3.67E-08 | 3.01E-11 | -2.20E-14 | 7.11E-17 |
| r10 | 1 | 1.23E-04 | -9.21E-07 | 1.00E-09 | 6.14E-11 | -3.13E-13 |

TABLE 8

| Unit | Surface | Coordinates X | Coordinates Z | Angle [deg.] | Distance | Radius of curvature | Refractive Index Ne | Abbe number νd |
|---|---|---|---|---|---|---|---|---|
| Pupil | I | 0.000 | 0.000 | 0.000 | | | 1 | — |
| G1 | r1 | 16.000 | 1.300 | 0.000 | 4.7 | 95.261 | 1.49329 | 57.82 |
| | r2 | | | | | -14.773 | 1 | — |
| G2 | r3 | 23.600 | -0.500 | -8.648 | | -11.714 | 1.62627 | 24.01 |
| | r4 | 24.400 | -1.700 | -16.599 | | -21.146 | 1 | — |
| G3 | r5 | 39.250 | -3.800 | 19.453 | | 92.421 | 1.52729 | 56.38 |
| | r6 | | | | 4.85 | -73.368 | | |
| | r7 | (The same as r5) | | | | | 1 | — |
| G4 | r8 | 26.100 | -11.100 | -138.960 | | 7.587 | 1.52729 | 56.38 |
| | r9 | 15.700 | -2.200 | 172.385 | | -26.178 | 1.52729 | 56.38 |
| | Aperture diaphragm | 17.750 | -20.471 | 14.678 | | — | 1.52729 | 56.38 |
| | r10 | 28.950 | -15.100 | -10.857 | | -16.532 | 1 | — |
| Evaluation Surface | K | 48.900 | -21.990 | 0.000 | | — | | |

TABLE 9

Diopter adjustment construction

| Unit | Name Surface | Coordinates X | Coordinates Z | Angle [deg.] |
|---|---|---|---|---|
| G2 | r 3 | 21.850 | -1.000 | -8.648 |
| (Diopter near side) | r 4 | 22.650 | -2.200 | -16.599 |
| G2 | r 3 | 25.350 | 0.000 | -8.648 |

TABLE 9-continued

Diopter adjustment construction

| Unit | Name Surface | Coordinates X | Coordinates Z | Angle [deg.] |
|---|---|---|---|---|
| (Diopter far side) | r 4 | 26.150 | -1.200 | -16.599 |

TABLE 7

Aspherical coefficient

| Surface | ε | A4 | A6 | A8 | A10 | A12 |
|---|---|---|---|---|---|---|
| r2 | 1 | 7.97E-05 | -2.02E-06 | 4.35E-08 | -4.08E-10 | 1.50E-12 |
| r3 | 1 | 1.54E-05 | 1.46E-06 | -1.33E-08 | 9.10E-11 | 6.08E-14 |
| r4 | 1 | 1.31E-04 | -1.71E-07 | 6.00E-09 | -4.96E-11 | 1.31E-13 |
| r5 (r7) | 1 | 1.29E-05 | 1.20E-07 | 2.18E-10 | 5.77E-13 | -1.47E-15 |
| r6 | 1 | 8.54E-06 | -3.81E-08 | 2.69E-11 | 1.99E-13 | -3.00E-16 |

TABLE 7-continued

Aspherical coefficient

| Surface | ε | A4 | A6 | A8 | A10 | A12 |
|---|---|---|---|---|---|---|
| r8 | 1 | −1.12E-04 | −3.16E-05 | 1.52E-06 | −3.87E-08 | 3.30E-10 |
| r9 | 1 | 3.39E-05 | −3.67E-08 | 3.01E-11 | −2.20E-14 | 7.11E-17 |
| r10 | 1 | 1.23E-04 | −9.21E-07 | 1.00E-09 | 6.14E-11 | −3.13E-13 |

TABLE 11

| Name | | Coordinates | | Angle | Distance | Radius of curvature | Refractive index Ne | Abbe number vd |
|---|---|---|---|---|---|---|---|---|
| Unit | Surface | X | Z | [deg.] | | | | |
| Pupil | I | 0.000 | 0.000 | 0.000 | | | 1 | — |
| G1 | r1 | 16.176 | 0.160 | 0.000 | 3.52 | 110.229 | 1.49329 | 57.82 |
| | r2 | | | | | −15.624 | 1 | — |
| G2 | r3 | 23.079 | −1.572 | −7.342 | | −10.138 | 1.62627 | 24.01 |
| | r4 | 23.606 | −5.607 | −26.057 | | −15.122 | 1 | — |
| G3 | r5 | 40.015 | −5.411 | −162.186 | | −53.459 | 1.52729 | 56.38 |
| | r6 | | | | 5.41 | 102.909 | | |
| | r7 | (The same as r5) | | | | | 1 | — |
| G4 | r8 | 26.984 | −12.631 | −139.698 | 2.51 | 8.534 | 1.52729 | 56.38 |
| | r9 | | | | | −102.329 | | |
| G5 | r10 | 26.706 | −16.962 | −141.345 | | 40.273 | 1.52729 | 56.38 |
| | r11 | 15.365 | −4.025 | −5.752 | | −24.193 | 1.52729 | 56.38 |
| | Aperture diaphragm | 18.053 | −22.222 | 16.375 | | — | 1.527.29 | 56.38 |
| | r10 | 29.021 | −15.874 | −14.131 | | −31.870 | 1 | — |
| Evaluation Surface | K | 54.153 | −23.580 | 0.000 | | — | | |

TABLE 12

Aspherical coefficient

| Surface | ε | A4 | A6 | A8 | A10 | A12 |
|---|---|---|---|---|---|---|
| r2 | 1 | 6.83E-05 | −2.25E-06 | 5.59E-08 | −6.03E-10 | 2.64E-12 |
| r3 | 1 | 7.08E-05 | 1.77E-06 | −7.47E-09 | −8.81E-11 | 2.65E-12 |
| r4 | 1 | 5.57E-05 | −2.24E-07 | 4.60E-09 | −1.99E-11 | 4.87E-14 |
| r5 (r7) | 1 | 9.42E-06 | −1.47E-07 | 1.52E-10 | 1.00E-12 | −1.53E-15 |
| r6 | 1 | 8.301E-06 | −4.87E-08 | 4.97E-11 | 1.21E-13 | −1.13E-18 |
| r8 | 1 | −1.07E-05 | −5.51E-05 | 2.62E-06 | −6.56E-08 | 5.69E-10 |
| r9 | 1 | −8.26E-05 | −1.77E-06 | 9.77E-09 | −1.46E-09 | −5.36E-12 |
| r10 | 1 | −3.34E-06 | −9.26E-07 | 1.48E-08 | 4.04E-10 | −5.29E-12 |
| r11 | 1 | 4.44E-05 | −4.68E-08 | 2.94E-11 | −2.04E-14 | 1.22E-16 |
| r12 | 1 | 7.55E-05 | −9.41E-07 | 1.40E-09 | 5.77E-11 | −2.76E-13 |

What is claimed is:

1. An observation optical system for transmitting incident light to a pupil of an observer, comprising:

a reflecting surface provided at a position substantially conjugate with the pupil of the observer so as to reflect the incident light incident on the reflecting surface, the reflecting surface having a first reflectance inside a reflection necessary range on the reflecting surface that is different from a second reflectance outside a reflection necessary range on the reflecting surface so as to limit a pupil of the observation optical system.

2. An observation optical system as claimed in claim 1, wherein the reflecting surface has a reflection-promoting treatment applied thereto inside the reflection necessary range thereof.

3. An observation optical system as claimed in claim 2, wherein the reflection-promoting treatment includes a metal film.

4. An observation optical system as claimed in claim 2, wherein the reflection-promoting treatment includes a coating of a reflection-promoting multilayer film.

5. An observation optical system as claimed in claim 1, wherein the reflecting surface has a reflection-suppressing treatment applied thereto outside the reflection necessary range thereof.

6. An observation optical system as claimed in claim 5, wherein the reflection-suppressing treatment includes a black film.

7. An observation optical system as claimed in claim 5, wherein the reflection-suppressing treatment includes a coating of a reflection-preventing multilayer film.

8. An observation optical system as claimed in claim 1, wherein the following condition is fulfilled:

Ri/Ro>10 where Ri represents the reflectance of the reflecting surface inside the reflection necessary range thereof and Ro represents the reflectance of the reflecting surface outside the reflection necessary range thereof.

9. An observation optical system as claimed in claim 1, wherein the following condition is fulfilled:

Ri>50% where Ri represents the reflectance of the reflecting surface inside the reflection necessary range thereof.

10. An observation optical system as claimed in claim 1, wherein the following condition is fulfilled:

Ro<5% where Ro represents the reflectance of the reflecting surface outside the reflection necessary range thereof.

11. An observation optical system as claimed in claim 1, wherein the reflecting surface has an optical power.

12. An observation optical system as claimed in claim 1, wherein the reflecting surface is an internal reflecting surface of a medium.

13. An observation optical system for transmitting incident light to a pupil of an observer, comprising:

a relay optical system for transmitting an image to the pupil of the observer, the relay optical system having a reflecting surface in an optical path thereof, the reflecting surface being provided at a position substantially conjugate with the pupil of the observer so as to reflect the incident light incident on the reflecting surface, the reflecting surface having a first reflectance inside a reflection necessary range on the reflecting surface that is different from a second reflectance outside a reflection necessary range on the reflecting surface so as to limit a pupil of the observation optical system.

14. An observation optical system as claimed in claim 13, wherein the reflecting surface has a reflection-promoting treatment applied thereto inside the reflection necessary range thereof.

15. An observation optical system as claimed in claim 14, wherein the reflection-promoting treatment includes a metal film.

16. An observation optical system as claimed in claim 14, wherein the reflection-promoting treatment includes a coating of a reflection-promoting multilayer film.

17. An observation optical system as claimed in claim 13, wherein the reflecting surface has a reflection-suppressing treatment applied thereto outside the reflection necessary range thereof.

18. An observation optical system as claimed in claim 17, wherein the reflection-suppressing treatment includes a black film.

19. An observation optical system as claimed in claim 17, wherein the reflection-suppressing treatment includes a coating of a reflection-preventing multilayer film.

20. An observation optical system as claimed in claim 13, wherein the following condition is fulfilled:

Ri/Ro>10 where Ri represents the reflectance of the reflecting surface inside the reflection necessary range thereof and Ro represents the reflectance of the reflecting surface outside the reflection necessary range thereof.

21. An observation optical system as claimed in claim 13, wherein the following condition is fulfilled:

Ri>50% where Ri represents the reflectance of the reflecting surface inside the reflection necessary range thereof.

22. An observation optical system as claimed in claim 13, wherein the following condition is fulfilled:

Ro<5% where Ro represents the reflectance of the reflecting surface outside the reflection necessary range thereof.

23. An observation optical system as claimed in claim 13, wherein the image transmitted by the relay optical system is formed by an objective lens system provided on an object side of the relay optical system.

24. An observation optical system as claimed in claim 13, wherein the reflecting surface has an optical power.

25. An observation optical system as claimed in claim 13, wherein the reflecting surface is an internal reflecting surface of a medium.

* * * * *